US012399447B2

(12) United States Patent
Imaizumi et al.

(10) Patent No.: US 12,399,447 B2
(45) Date of Patent: Aug. 26, 2025

(54) IMAGE FORMING APPARATUS

(71) Applicant: CANON KABUSHIKI KAISHA, Tokyo (JP)

(72) Inventors: Chikara Imaizumi, Shizuoka (JP); Satoshi Murasaki, Shizuoka (JP); Kiyoshi Furuta, Shizuoka (JP); Shinya Noda, Shizuoka (JP); Kunihiro Niwa, Shizuoka (JP); Yoji Misao, Shizuoka (JP); Tomooku Koyama, Shizuoka (JP); Tomoki Katafuchi, Shizuoka (JP); Tomonari Inoue, Kanagawa (JP); Koichi Sekimizu, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/465,866

(22) Filed: Sep. 12, 2023

(65) Prior Publication Data

US 2024/0085825 A1 Mar. 14, 2024

(30) Foreign Application Priority Data

Sep. 14, 2022 (JP) ................................ 2022-145891
Jul. 31, 2023 (JP) ................................ 2023-125135

(51) Int. Cl.
*G03G 21/16* (2006.01)
*G03G 15/00* (2006.01)
(Continued)

(52) U.S. Cl.
CPC ..... *G03G 15/0868* (2013.01); *G03G 15/0121* (2013.01); *G03G 15/0189* (2013.01);
(Continued)

(58) Field of Classification Search
CPC ............... G03G 21/16; G03G 21/1609; G03G 21/1619; G03G 21/1623; G03G 21/1633;
(Continued)

(56) References Cited

U.S. PATENT DOCUMENTS

2003/0053819 A1 3/2003 Nomura et al.
2006/0140669 A1* 6/2006 Sato .................. G03G 21/1647 399/121
2006/0251446 A1 11/2006 Okabe
2007/0248377 A1* 10/2007 Palumbo ............ G03G 21/1638 399/107
(Continued)

FOREIGN PATENT DOCUMENTS

JP 2001034021 A 2/2001
JP 2002304032 A 10/2002
(Continued)

*Primary Examiner* — Thomas S Giampaolo, II
(74) *Attorney, Agent, or Firm* — CANON U.S.A., INC. IP DIVISION

(57) ABSTRACT

An image forming apparatus to form an image on a recording material includes an apparatus main body having a first end provided with an opening and having a second end, a fixing device to heat the recording material, an opening and closing member, a drawer unit having a first photosensitive drum, and a transfer device. When being moved from a first inner position inside the apparatus main body to a first outer position outside the apparatus main body through the main body opening, the drawer unit is to be moved in a moving direction intersecting with a rotation axis of the first photosensitive drum, and is to be moved away from the second end. When being moved from a second inner position inside the apparatus main body to a second outer position outside the apparatus main body, the transfer device is moved away from the second end.

17 Claims, 25 Drawing Sheets

(51) Int. Cl.
*G03G 15/01* (2006.01)
*G03G 15/08* (2006.01)
*G03G 15/20* (2006.01)

(52) U.S. Cl.
CPC ..... *G03G 15/2064* (2013.01); *G03G 15/5008* (2013.01); *G03G 15/751* (2013.01); *G03G 2215/066* (2013.01)

(58) Field of Classification Search
CPC ........... G03G 21/1647; G03G 21/1676; G03G 21/168; G03G 2221/16; G03G 2221/1642; G03G 2221/1678; G03G 2221/1684; G03G 2221/169
See application file for complete search history.

(56) References Cited

U.S. PATENT DOCUMENTS

| | | | | |
|---|---|---|---|---|
| 2010/0080619 | A1* | 4/2010 | Kawanami ......... | G03G 21/1853 399/112 |
| 2011/0305479 | A1 | 12/2011 | Nishiuwatoko | |

FOREIGN PATENT DOCUMENTS

| | | | |
|---|---|---|---|
| JP | 2006184901 | A | 7/2006 |
| JP | 2006350379 | A | 12/2006 |
| JP | 2010102321 | A | 5/2010 |
| JP | 2010-244018 | A | 10/2010 |
| JP | 2012073297 | A | 4/2012 |
| JP | 2014126839 | A | 7/2014 |
| JP | 2015-206897 | A | 11/2015 |

* cited by examiner

IMAGE FORMING APPARATUS

BACKGROUND

Field

The present disclosure relates to an image forming apparatus that forms an image on a recording material.

Description of the Related Art

Some image forming apparatuses, including a printer, a copying machine, and a multifunction peripheral, may include cartridges that are detachably attached to a tray that moves between inside and outside the apparatus main body.

Japanese Patent Application Laid-Open No. 2010-244018 discusses an image forming apparatus including a tray to which cartridges are detachably attached and a fixing device. The tray can be moved out of the apparatus main body of the image forming apparatus through a plurality of openings.

Japanese Patent Application Laid-Open No. 2015-206897 discusses an image forming apparatus including a tray to which cartridges are detachably attached, a transfer unit, and a fixing device. According to Japanese Patent Application Laid-Open No. 2015-206897, the tray and the transfer unit can be moved from inside to outside the image forming apparatus. Specifically, the fixing device is disposed at one end side of the apparatus main body of the image forming apparatus. When the transfer unit is moved out of the apparatus main body, the transfer unit moves in a direction from the other end side to the one end side of the apparatus main body. By contrast, when the tray is moved out of the apparatus main body, the tray is moved in a direction from the one end side to the other end side of the apparatus main body.

SUMMARY

The present disclosure is directed to further developing the conventional technique.

According to an aspect of the present disclosure, an image forming apparatus configured to form an image on a recording material includes an apparatus main body including a first end provided with a main body opening and a second end opposite to the first end in a horizontal direction, a fixing device configured to heat the recording material, an opening and closing member attached to the apparatus main body, wherein the opening and closing member is configured to be moved from a closed position, where the main body opening is covered, to an open position where the main body opening is exposed so that the opening and closing member separates from the fixing device, a drawer unit including (i) a first cartridge, (ii) a support member to which the first cartridge is detachably attached, and (iii) a first photosensitive drum disposed on the support member or the first cartridge, wherein the drawer unit is configured to be moved to a first inner position inside the apparatus main body and to a first outer position outside the apparatus main body, and a transfer device configured to be moved to a second inner position inside the apparatus main body and to a second outer position outside the apparatus main body and including a belt wherein the belt is configured to contact the first photosensitive drum with the transfer device at the second inner position, wherein the fixing device is closer to the first end than to the second end, wherein, when being moved from the first inner position to the first outer position through the main body opening, the drawer unit is configured to be moved in a moving direction intersecting with a rotation axis of the first photosensitive drum, and be moved away from the second end, and wherein, when being moved from the second inner position to the second outer position, the transfer device is configured to be moved away from the second end.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the drawings. It should be noted that dimensions, materials, shapes, and relative arrangement of components described in the exemplary embodiments are subject to appropriate changes depending on the configurations of the apparatuses to which the exemplary embodiments are applied and various conditions. In other words, the scope of the disclosure is not intended to be limited to the following exemplary embodiments.

[Overall Configuration]

Figure 1:
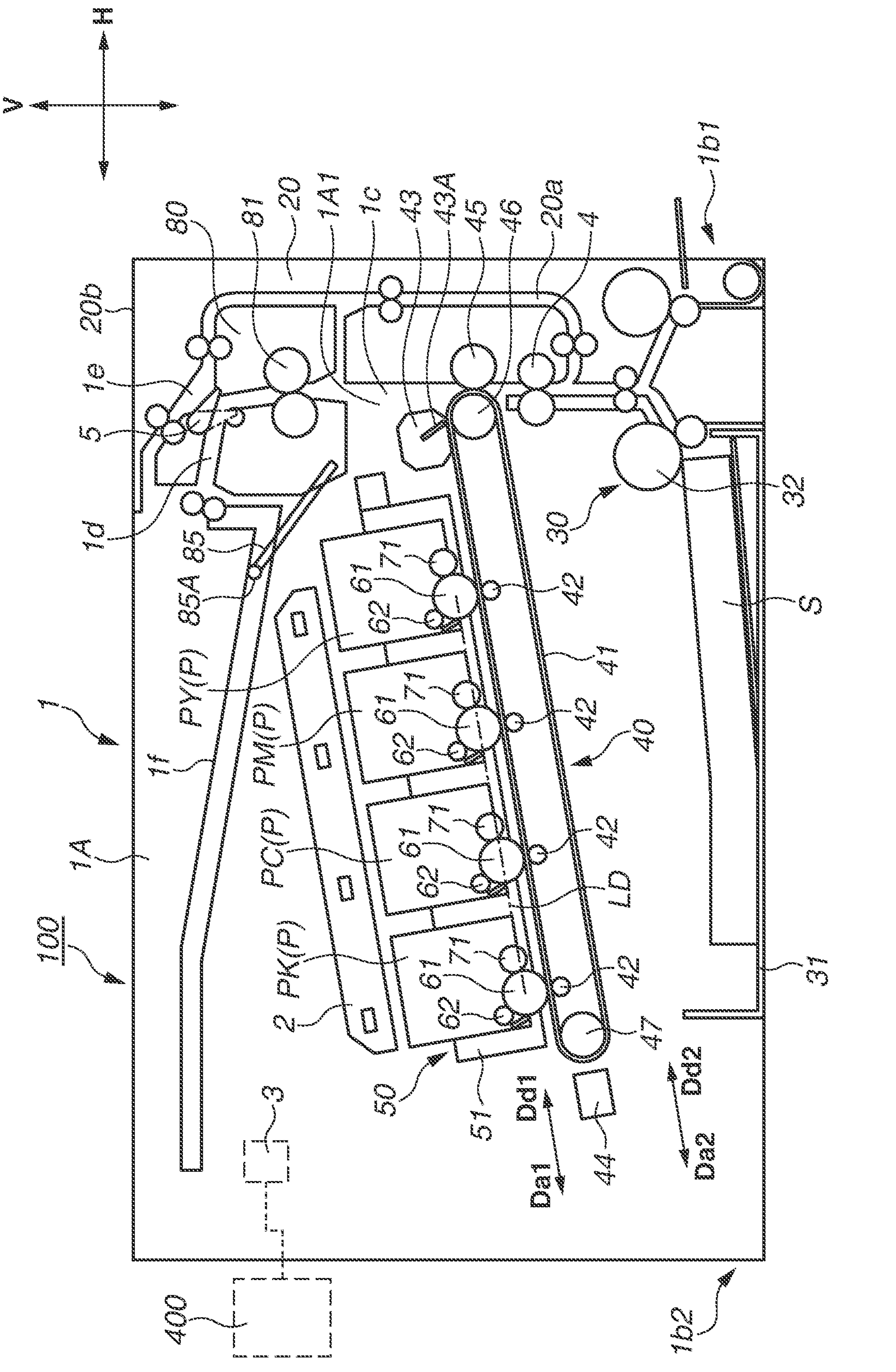
FIG. 1 illustrates the overall configuration of a printer according to a first exemplary embodiment.

A first exemplary embodiment will be described. A printer 1 that is an image forming apparatus will be described with reference to FIG. 1. FIG. 1 illustrates an overall configuration of the printer 1 according to the present exemplary embodiment. In the present exemplary embodiment, the printer 1 is an electrophotographic color laser beam printer that forms an image on a sheet S serving as a recording material.

The printer 1 includes an apparatus main body (housing) 1A, a scanner (exposure device) 2, a control unit 3, and a door (opening and closing member) 20 openable and closable with respect to the apparatus main body 1A. The printer 1 further includes a sheet feed unit 30, a transfer unit (transfer device) 40, a tray unit (moving unit or support unit) 50, and a fixing device 80. A portion including the apparatus main body 1A and the door 20 may be referred to as a main frame 100. The main frame 100 includes an exterior cover portion of the printer 1.

The apparatus main body 1A accommodates the scanner 2, the control unit 3, the sheet feed unit 30, the transfer unit 40, the tray unit 50, and the fixing device 80.

The sheet feed unit 30 includes a stacking tray 31 where sheets S serving as a recording material are stacked, and a feed roller 32. The stacking tray 31 can be pulled out in a direction toward the door 20 and replenished with sheets S.

The tray unit 50 includes a tray (support member or drawer) 51 and cartridges PY, PM, PC, and PK. The tray 51 includes a tray handle 52. The cartridges PY, PM, PC, and PK are detachably attached to the tray 51.

The cartridges PY, PM, PC, and PK can be attached to and detached from the tray 51 independent of each other. The cartridges PY, PM, PC, and PK accommodate yellow (Y), magenta (M), cyan (C), and black (K) toners (developers), respectively. The cartridges PY, PM, PC, and PK have the same configuration except that toners of different colors are accommodated. A configuration and operation of one of the cartridges PY, PM, PC, and PK will therefore be described, and a description of the others will be omitted in some cases. If the cartridges PY, PM, PC, and PK do not need to be distinguished, the cartridges PY, PM, PC and PK may be referred to simply as cartridges P. The tray unit 50 can be said to include a plurality of cartridges P and the tray 51 to which the plurality of cartridges P is detachably attached.

In the present exemplary embodiment, the tray unit 50 includes a plurality of photosensitive drums (image bearing members) 61, a plurality of charging rollers (charging members) 62, and a plurality of developing rollers (developer bearing members) 71. Specifically, the tray unit 50 includes four photosensitive drums 61, four charging rollers 62, and four developing rollers 71. The directions of the rotation axes of the photosensitive drums 61, those of the developing rollers 71, and those of the charging rollers 62 are parallel.

The portion to form a K image will be referred to as a K station (first station). The photosensitive drum 61 of the first station will be referred to as a first photosensitive drum, the developing roller 71 a first developing roller, and the charging roller 62 a first charging roller.

The portion to form a C image will be referred to as a C station (second station). The photosensitive drum 61 of the second station will be referred to as a second photosensitive drum, the developing roller 71 a second developing roller, and the charging roller 62 a second charging roller.

The portion to form an M image will be referred to as an M station (third station). The photosensitive drum 61 of the third station will be referred to as a third photosensitive drum, the developing roller 71 a third developing roller, and the charging roller 62 a third charging roller.

The portion to form a Y image will be referred to as a Y station (fourth station). The photosensitive drum 61 of the fourth station will be referred to as a fourth photosensitive drum, the developing roller 71 a fourth developing roller, and the charging roller 62 a fourth charging roller.

The cartridge PK is attached to the K station, the cartridge PC to the C station, the cartridge PM to the M station, and the cartridge PY to the Y station. In the present exemplary embodiment, the cartridge PK will be referred to as a first cartridge, the cartridge PC a second cartridge, the cartridge PM a third cartridge, and the cartridge PY a fourth cartridge.

The ordinal numbers the first, second, third, and fourth are used for the convenience of description.

The photosensitive drums 61, the charging rollers 62, and the developing rollers 71 may be provided either in the cartridges P or on the tray 51. In the present exemplary embodiment, the cartridges P include the photosensitive drums 61, the charging rollers 62, and the developing rollers 71.

The transfer unit 40 includes a belt 41, primary transfer rollers 42, a cleaning unit 43, a driving roller 46 for driving the belt 41, and a tension roller (driven roller) 47. The printer 1 according to the present exemplary embodiment includes an optical sensor 44 for detecting a toner image transferred to the belt 41. In the present exemplary embodiment, the belt 41 is disposed under the photosensitive drums 61, and can contact the photosensitive drums 61 to form primary transfer portions between the belt 41 and the photosensitive drums 61. The printer 1 also includes a secondary transfer roller 45 that contacts the belt 41 to form a secondary transfer portion. The secondary transfer portion is formed between the belt 41 and the secondary transfer roller 45. The directions of the rotation axes of the primary transfer rollers 42, that of the driving roller 46, that of the tension roller 47, and that of the secondary transfer roller 45 are parallel. A registration roller pair 4 is arranged in front of the secondary transfer portion.

The fixing device 80 includes a fixing unit 81 and a flapper 5. When an image forming operation is performed on a sheet S, the fixing device 80 is at a use position. The fixing device 80 is accommodated at the use position in (inside) the apparatus main body 1A. The fixing device 80 is configured to heat the sheet S at the use position. In the present exemplary embodiment, the fixing unit 81 includes a heating unit (heating roller) including a heater, and a pressure unit (pressure roller).

Figure 2:
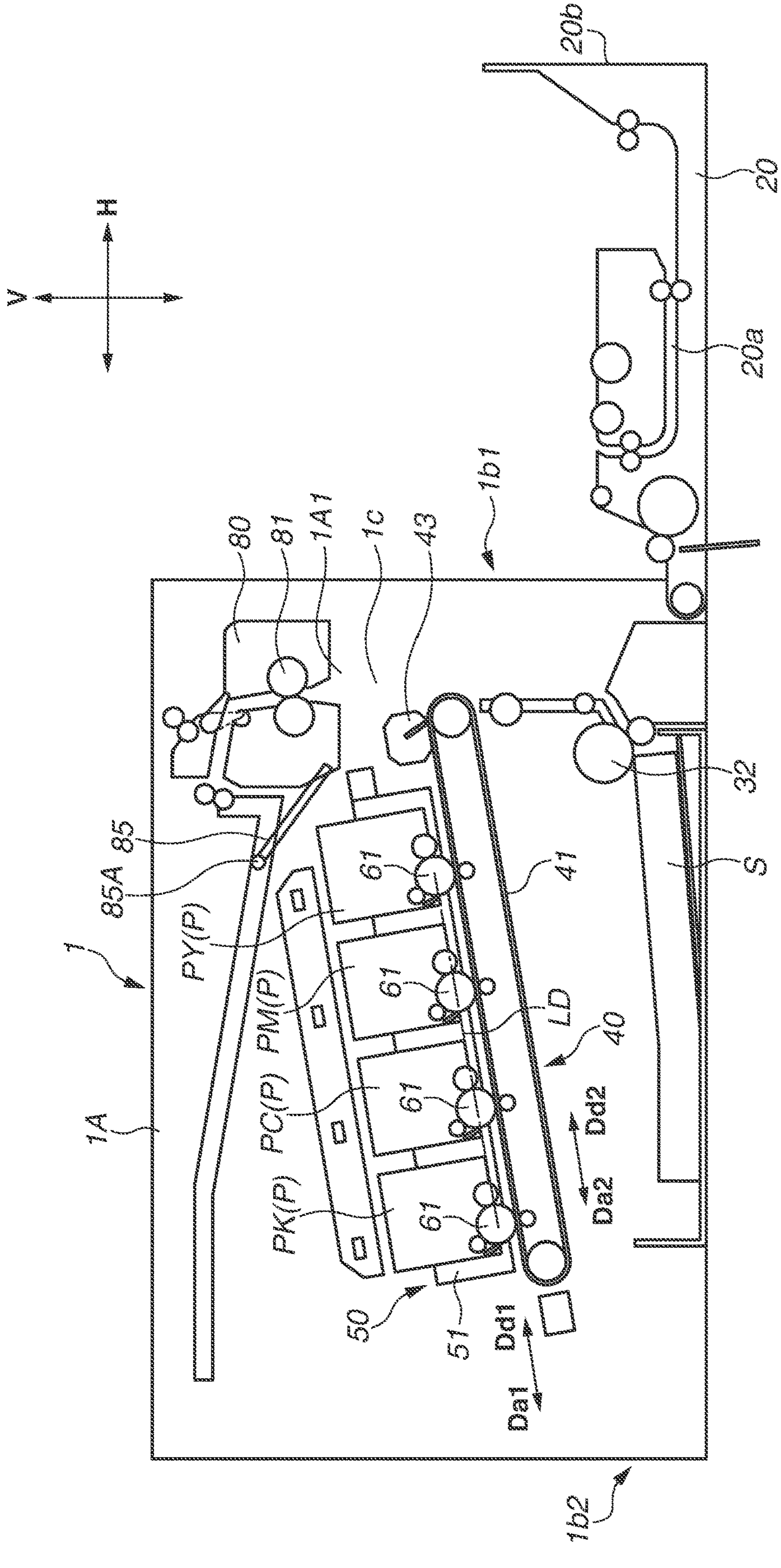
FIG. 2 is a diagram illustrating a printer according to the first exemplary embodiment with a door open.
Figure 3:
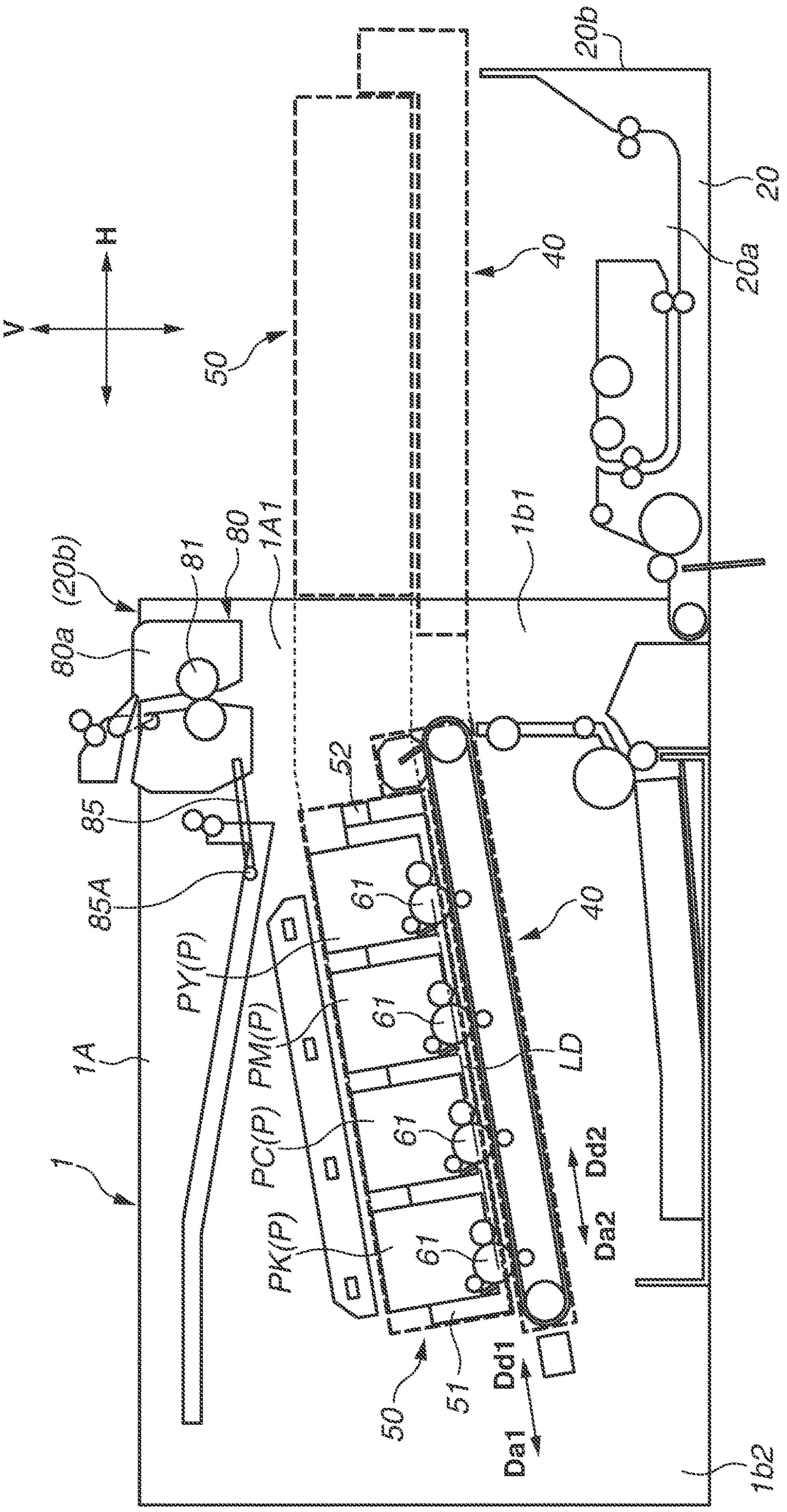
FIG. 3 is a diagram illustrating the printer according to the first exemplary embodiment with a fixing device moved.
Figure 4:
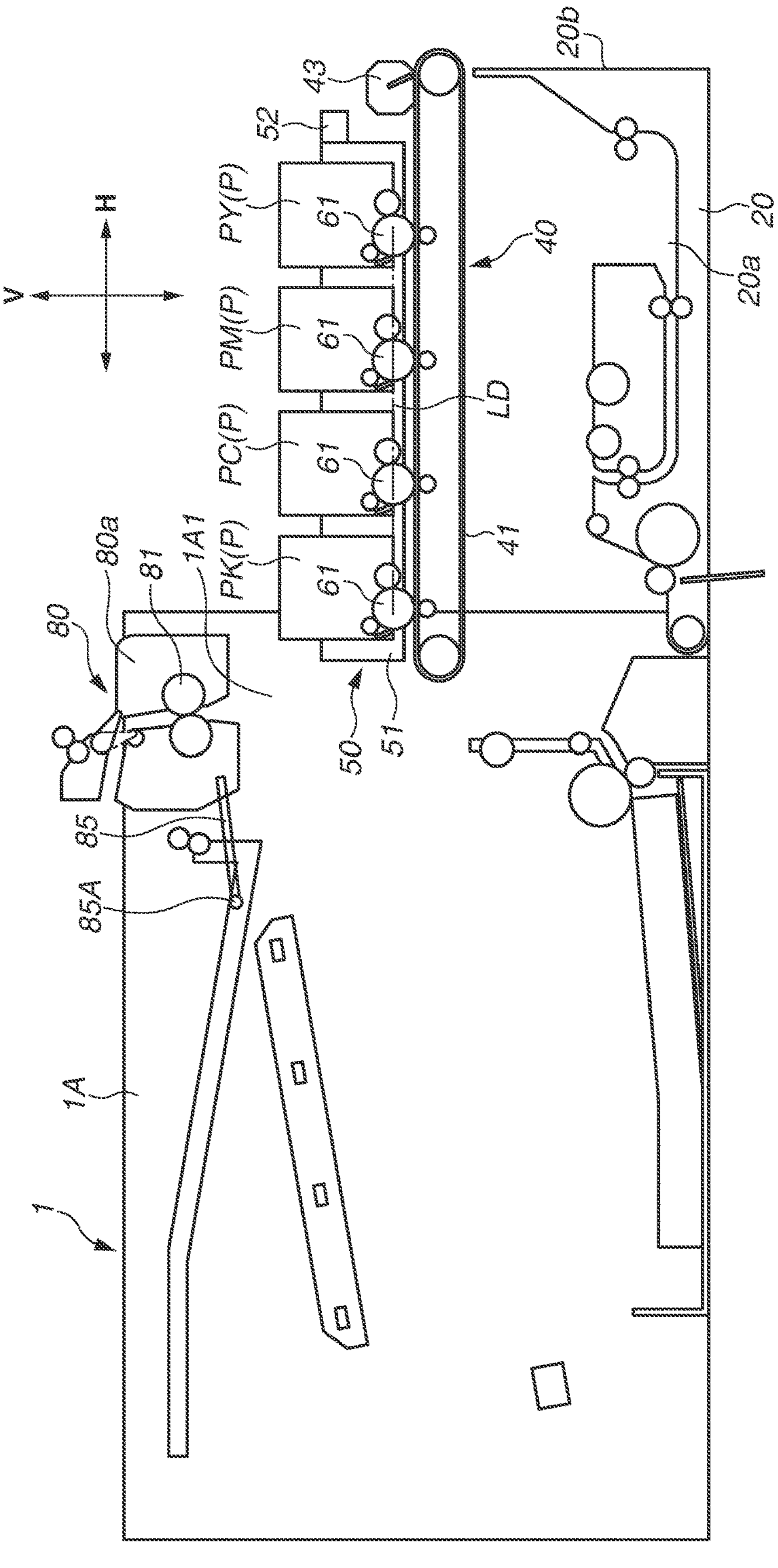
FIG. 4 is a diagram illustrating the printer according to the first exemplary embodiment when a transfer unit and a tray unit are pulled out.
Figure 5:
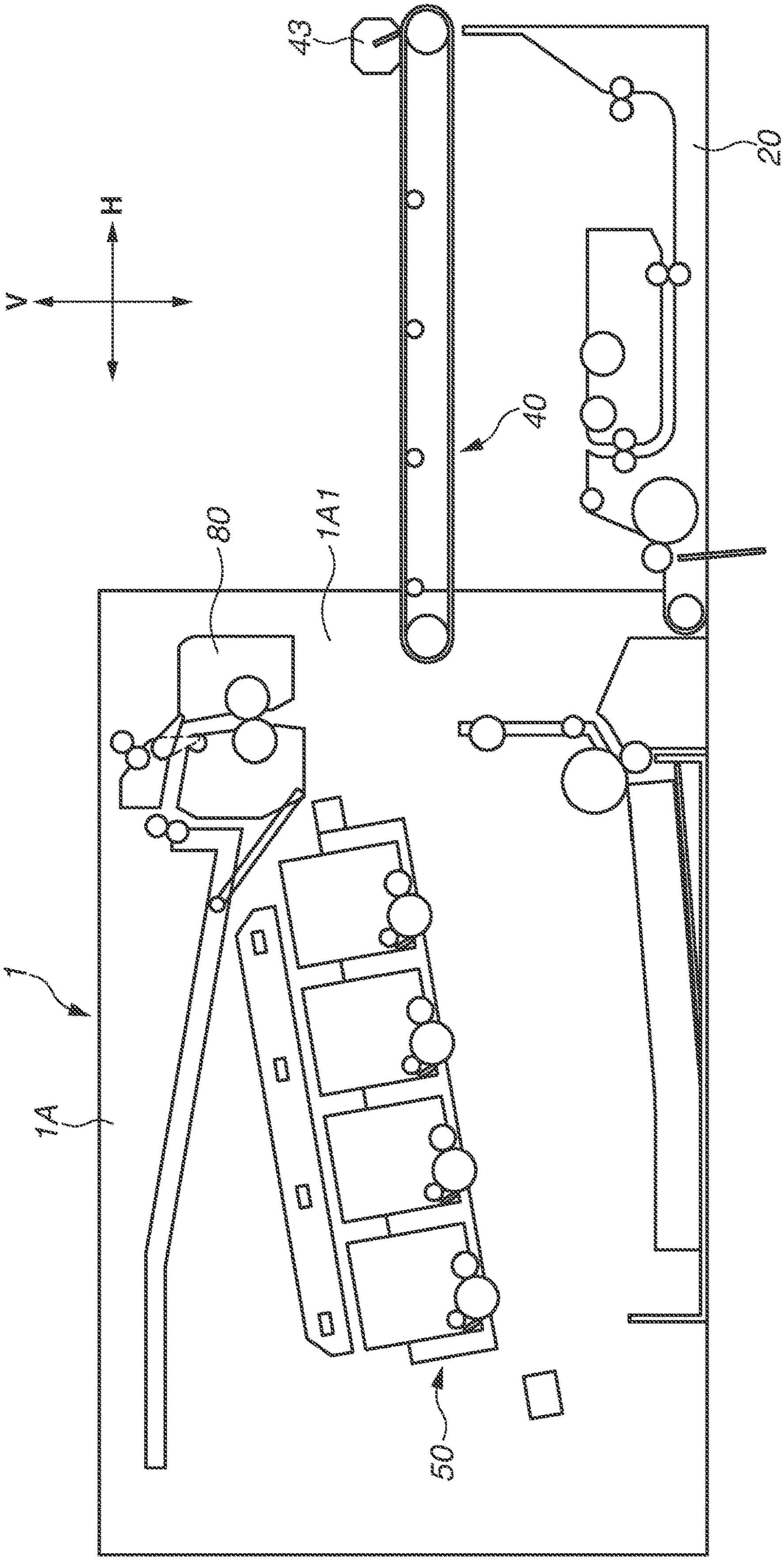
FIG. 5 is a diagram illustrating the printer according to the first exemplary embodiment with the transfer unit alone pulled out.

A movement of the transfer unit 40 and the tray unit 50 will be described with reference to FIGS. 1, 2, 3, 4, and 5. FIG. 2 is a diagram illustrating the printer 1 with the door 20 open. FIG. 3 is a diagram illustrating the printer 1 with the fixing device 80 moved. FIG. 4 is a diagram illustrating the printer 1 with the transfer unit 40 and the tray unit 50 pulled out. FIG. 5 is a diagram illustrating the printer 1 with only the transfer unit 40 pulled out.

The transfer unit 40 and the tray unit 50 can be moved from inside to outside the apparatus main body 1A. The apparatus main body 1A has a first end 1*b*1 provided with an opening (main body opening) 1A1 and a second end 1*b*2 opposite to the first end 1*b*1 in a horizontal direction H. The tray unit 50 can be moved to a first inner position inside the apparatus main body 1A and to a first outer position outside the apparatus main body 1A through the opening 1A1. The transfer unit 40 can be moved to a second inner position inside the apparatus main body 1A and to a second outer position outside the apparatus main body 1A through the opening 1A1. The opening 1A1 may include an opening for the tray unit 50 to pass through and an opening for the transfer unit 40 to pass through. When the transfer unit 40 is moved from the second inner position to the second outer position, at least the belt 41 is moved so that at least a part of the belt 41 protrudes outward from the apparatus main body 1A.

The direction in which the tray unit 50 is moved from the first inner position to the first outer positions will be referred to as a tray detachment direction Dd1. The direction opposite to the tray detachment direction Dd1 will be referred to as a tray attachment direction Da1. The tray detachment direction Dd1 can be said to be a direction from the second end 1*b*2 to the first end 1*b*1.

The direction in which the transfer unit 40 is moved from the second inner position to the second outer position will be referred to as a transfer detachment direction Dd2. The direction opposite to the transfer detachment direction Dd2 will be referred to as a transfer attachment direction Da2. The driving roller 46 is disposed downstream of the tension roller 47 in the transfer detachment direction Dd2. The transfer detachment direction Dd2 can be said to be a direction from the second end 1*b*2 to the first end 1*b*1.

The tray detachment direction Dd1 and the tray attachment direction Da1 are directions intersecting with (desirably, orthogonal to) the directions of the rotation axes of the photosensitive drums 61. The transfer detachment direction Dd2 and the transfer attachment direction Da2 are directions intersecting with (desirably, orthogonal to) the direction of the rotation axis of the driving roller 46. The direction of the rotation axis of the driving roller 46 is parallel to those of the photosensitive drums 61.

The fixing device 80 is disposed at one end side (side where the first end 1*b*1 is located) of the apparatus main body 1A in the horizontal direction H.

The door 20 attached to the apparatus main body 1A can be moved between a closed position and an open position. As illustrated in FIG. 1, at the closed position (closed state of the door 20), the door 20 covers the opening 1A1. As illustrated in FIG. 2, at the open position (open state of the door 20), the opening 1A1 is exposed.

As illustrated in FIG. 1, with the door 20 at the closed position, the door 20 covers the fixing device 80 attached to the apparatus main body 1A. More specifically, with the door 20 at the closed position, an upper cover portion 20*b* of the door 20 is located above the fixing device 80. The upper cover portion 20*b* of the door 20 has a function as a part of the exterior cover portion.

The door 20 can be moved to the open position and the closed position with the fixing device 80 supported by the apparatus main body 1A. In other words, the door 20 is moved from the closed position to the open position as separating (getting away) from the fixing device 80 supported by the apparatus main body 1A. As illustrated in FIG. 2, when the door 20 is at the open position, the door 20 is away from the fixing device 80 supported by the main body 1A.

As will be described below, the fixing device 80 can be moved from the state of FIG. 2 to the state of FIG. 3 so that the opening 1A1 is exposed wide. With the door 20 and the fixing device 80 moved (FIG. 3), the transfer unit 40 and the tray unit 50 can be moved from inside to outside the apparatus main body 1A through the opening 1A1. FIG. 4 illustrates the state after the movement.

With the tray unit 50 moved out of the apparatus main body 1A (FIG. 4), the cartridges PY, PM, PC, and PK can be detached from the tray 51, and can be attached to the tray 51. The cartridges PY, PM, PC, and PK can thereby be replaced with new cartridges PY, PM, PC, and PK. In the present exemplary embodiment, the cartridges P can be attached to and detached from the tray 51 in a direction intersecting with (desirably, orthogonal to) the rotation axes of the photosensitive drums 61. The cartridges PY, PM, PC, and PK are detached from the tray 51 by being moved in a direction away from the transfer unit 40. In other words, the cartridges PY, PM, PC, and PK are detached from the tray 51 by being moved in a direction opposite from the transfer unit 40. In the present exemplary embodiment, the transfer unit 40 is disposed under the tray unit 50. The cartridges PY, PM, PC, and PK are therefore detached from the tray 51 by being moved up from the tray 51.

Moreover, the transfer unit 40 can be detached from the apparatus main body 1A independent of the tray unit 50, and can be replaced with a new transfer unit 40.

[Image Forming Operation]

An image forming operation by the printer 1 will be described with reference to FIG. 1. The control unit 3 of the printer 1 starts an image forming operation on a sheet S based on an image signal received from an external host apparatus 400. Examples of the external host apparatus 400 include a personal computer, an image reader, and a facsimile.

In performing image formation on the sheet S, the fixing device 80 is positioned at the use position, the tray unit 50 at the first inner position, the transfer unit 40 at the second inner position, and the door 20 at the closed position. With the transfer unit 40 at the second inner position, the belt 41 can contact the photosensitive drum 61. Here, the tray unit 50 is located above the transfer unit 40.

A charging voltage is applied to the charging roller 62 as the photosensitive drum 61 is rotated. The scanner 2 irradiates the photosensitive drum 61 with laser corresponding to image information, whereby the surface of the photosensitive drum 61 charged by the charging roller 62 is exposed, forming an electrostatic latent image corresponding to the image information on the surface of the photosensitive drum 61.

The developing roller 71 bears toner. A developing voltage is applied to the developing roller 71, and the electrostatic latent image formed on the photosensitive drum 61 is developed with toner supplied from the developing roller 71, whereby a toner image is formed on the surface of the photosensitive drum 61. In the present exemplary embodiment, the developing roller 71 in contact with the photosensitive drum 61 develops the electrostatic latent image.

However, the developing roller 71 may develop the electrostatic latent image through a gap between the developing roller 71 and the photosensitive drum 61.

In forming a full-color image, toner images of respective colors are formed on the photosensitive drums 61.

In the present exemplary embodiment, with the tray unit 50 at the first inner position, the developing roller 71 can be moved between a contact position where the developing roller 71 contacts the photosensitive drum 61 and a separated position where the developing roller 71 is separated from the photosensitive drum 61. Specifically, the state where the developing roller 71 is at the contact position and the state where the developing roller 71 is at the separated position are switched by a switching device included in the apparatus main body 1A. The developing roller 71 can thus be kept separated from the photosensitive drum 61 in a state where no image forming operation is performed.

The printer 1 can perform monochrome printing in a state where the developing roller 71 and the photosensitive drum 61 corresponding to the cartridge PK are in contact with each other and the developing rollers 71 and the photosensitive drums 61 corresponding to the cartridges PY, PM, and PC are separated from each other. The printer 1 can perform full-color printing in a state where the photosensitive drums 61 corresponding to the cartridges PY, PM, PC, and PK contact the belt 41.

The toner image formed on each photosensitive drum 61 is transferred to the belt 41 by the primary transfer roller 42 at the primary transfer portion, and conveyed to the secondary transfer portion formed by the belt 41 and the secondary transfer roller 45.

The apparatus main body 1A includes a conveyance path (first path or first conveyance path) 1*c* for the sheet S traveling toward the fixing device 80 to pass through. The door 20 includes a two-sided conveyance path (second path or second conveyance path) 20*a* for the sheet S passed through the fixing device 80 to pass through. The door 20 in the closed state covers the conveyance path 1*c*. With the door 20 open, the conveyance path 1*c* and the two-sided conveyance path 20*a* are exposed (FIG. 2).

In the sheet feed unit 30, each of the sheets S stacked in the stacking tray 31 is separated and fed by the feed roller 32 at predetermined timing, and conveyed toward the secondary transfer portion and the fixing device 80 through the conveyance path 1*c*.

At the secondary transfer portion, the toner image is transferred from the belt 41 to the sheet S. Toner not transferred to the sheet S is removed from the belt 41 with a cleaning blade (cleaning member) 43A arranged in the cleaning unit 43.

The sheet S to which the toner image is transferred at the secondary transfer portion is conveyed toward the fixing device 80. In the fixing device 80, the sheet S is heated and pressed by the fixing unit 81, whereby the toner image is fixed to the sheet S. The sheet S to which the toner image is fixed is conveyed toward the flapper 5 serving as a path switching unit.

The flapper 5 can be moved to a sheet discharge position where the sheet S that has passed through the fixing device 80 is guided to a sheet discharge path 1*d* and a reversing position where the sheet S is guided to a reversing path 1*e*.

In performing one-sided printing where an image is formed on one side of the sheet S, the sheet S is guided to the sheet discharge path 1*d* by the flapper 5, and discharged to a discharge tray 1*f* formed in the upper part of the apparatus main body 1A.

In performing two-sided printing where images are printed on the front and back of the sheet S, the sheet S is guided to the reversing path 1*e* by the flapper 5. After the sheet S is guided to the reversing path 1*e*, the conveyance direction of the sheet S is reversed and the sheet S is conveyed toward the secondary transfer portion through the two-sided conveyance path 20*a* formed in the door 20. At the secondary transfer portion, a toner image is transferred to the back of the sheet S. The sheet S then passes through the fixing device 80, is guided to the sheet discharge path 1*d* by the flapper 5, and discharged to the discharge tray 1*f* of the apparatus main body 1A.

[Detachment of Tray Unit and Transfer Unit and Layout of Fixing Device]

The detachment of the tray unit 50 and the transfer unit 40 from the apparatus main body 1A and the layout of the fixing device 80 will be described with reference to FIGS. 1, 2, 3, 4, and 5.

As described above, the fixing device 80 of the printer 1 is disposed at one end side of the apparatus main body 1A in the horizontal direction H. The transfer unit 40 and the tray unit 50 are moved out of the apparatus main body 1A from the one end side of the apparatus main body 1A through the opening 1A1.

In other words, in the horizontal direction H, the fixing device 80 is closer to the first end 1*b*1 than to the second end 1*b*2. That is, in the horizontal direction H, the distance between the fixing device 80 and the first end 1*b*1 is smaller than the distance between the fixing device 80 and the second end 1*b*2. The fixing device 80 can be said to be positioned closer to the first end 1*b*1 than the center of the apparatus main body 1A is in the horizontal direction H. The distance between the first end 1*b*1 and the fixing device 80 in the horizontal direction H can be said to be smaller than the distance between the first end 1*b*1 and the center of the apparatus main body 1A.

As described above, when the tray unit 50 is moved from the first inner position to the first outer position, the moving direction of the tray unit 50 intersects with the rotation axes of the photosensitive drums 61. Here, the tray unit 50 is moved away from the second end 1*b*2.

As described above, when the transfer unit 40 is moved from the second inner position to the second outer position, the moving direction of the transfer unit 40 intersects with the rotation axis of the driving roller 46. Here, the transfer unit 40 is moved away from the second end 1*b*2.

As described above, the door 20 according to the present exemplary embodiment covers the opening 1A1 and at least a part of the conveyance path 1*c* of the sheet S in the closed state. Moreover, the door 20 includes the two-sided conveyance path 20*a*.

If the sheet S jams, the user of the printer 1 can clear the jam by removing the sheet S from the one end side of the apparatus main body 1A. Specifically, the user can move the door 20 to the open position and access the interior of the apparatus main body 1A to remove the sheet S. If a part of the sheet S that has passed through the fixing device 80 is exposed outside the apparatus main body 1A, the user can remove the sheet S by pulling the sheet S from outside the apparatus main body 1A without opening the door 20.

The user of the printer 1 can further perform operations, such as status check, maintenance, and replacement of the transfer unit 40 and the cartridges P by moving the transfer unit 40 and the tray unit 50 out of the apparatus main body 1A from the one end side of the apparatus main body 1A.

In other words, while the printer 1 includes the fixing device 80 disposed at the one end side of the apparatus main body 1A, the transfer unit 40 and the tray unit 50 can be moved into and out of the apparatus main body 1A through the one end side of the apparatus main body 1A. As a result, the user can clear a jam, access the fixing device 80, and operate the transfer unit 40 and the tray unit 50 in one direction.

In the present exemplary embodiment, the front of the printer 1 is the door 20 side. A working space for clearing a jam and operating the transfer unit 40 and the tray unit 50 can thus be provided in front of the printer 1. By contrast, a space for performing such operations from the left, right, rear, or top of the printer 1 does not need to be provided. The printer 1 can thus be installed in a space saving manner.

Suppose that the transfer unit 40 or the tray unit 50 is pulled out from the other end side of the apparatus main body 1A. In such a case, to clear a jam and pull out the transfer unit 40 or the tray unit 50, the user accesses the apparatus main body 1A from both sides. If the transfer unit 40 or the tray unit 50 is pulled out from one end side of the apparatus main body 1A and the other from the other end side, the user also accesses the apparatus main body 1A from both sides. The area for installing the printer 1 thus increases due to the presence of working spaces behind the apparatus main body 1A, as well as in front of the apparatus main body 1A.

Moreover, in the present exemplary embodiment, the apparatus main body 1A can be replenished with sheets S from the one end side. The space for replenishing the printer 1 with sheets S can thus be provided in front, and the printer 1 can be installed in a space saving manner.

[Relationship Between Tray Unit and Fixing Device]

Figure 6:
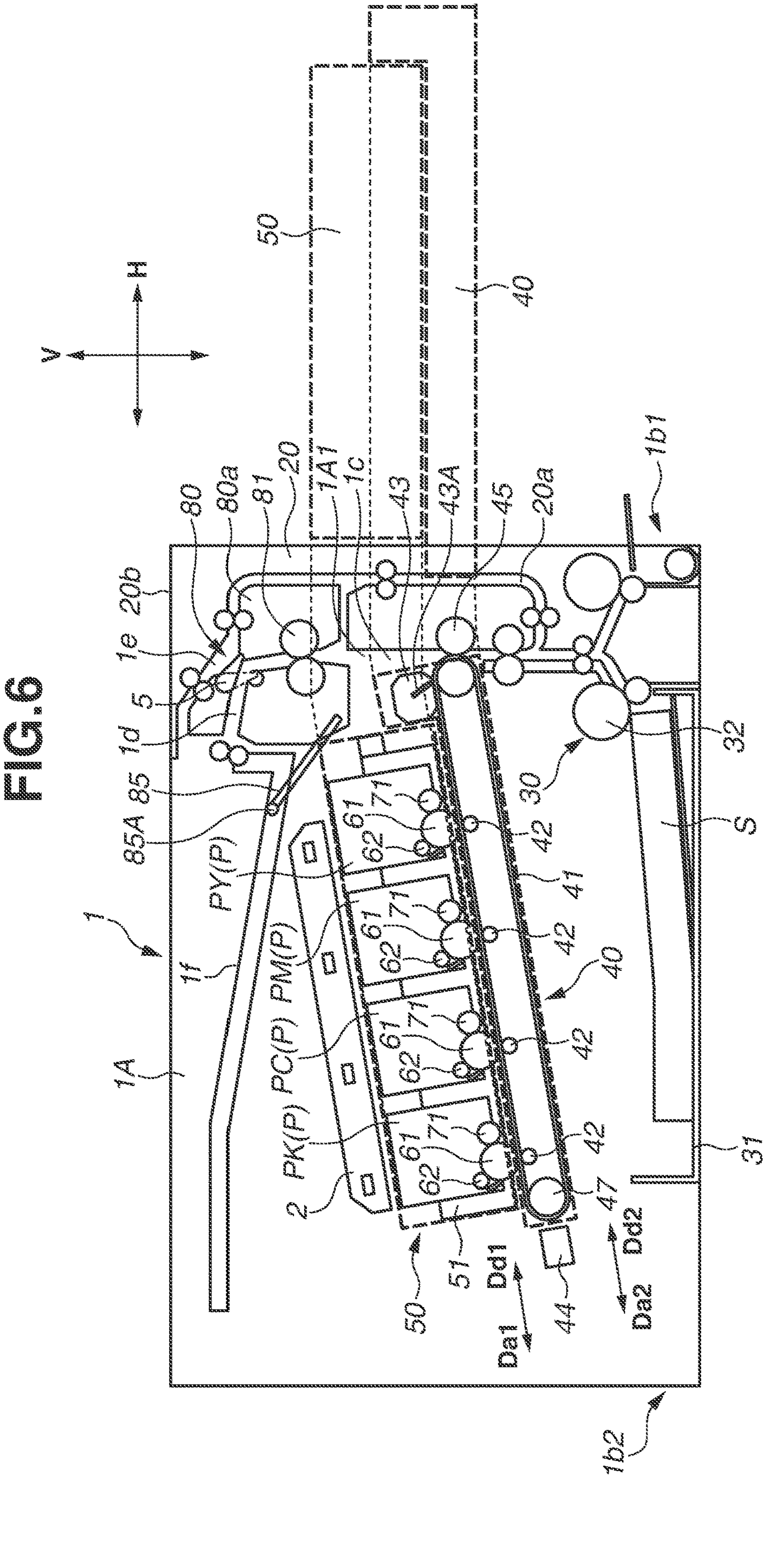
FIG. 6 illustrates a movement of the transfer unit and the tray unit according to the first exemplary embodiment.
Figure 7:
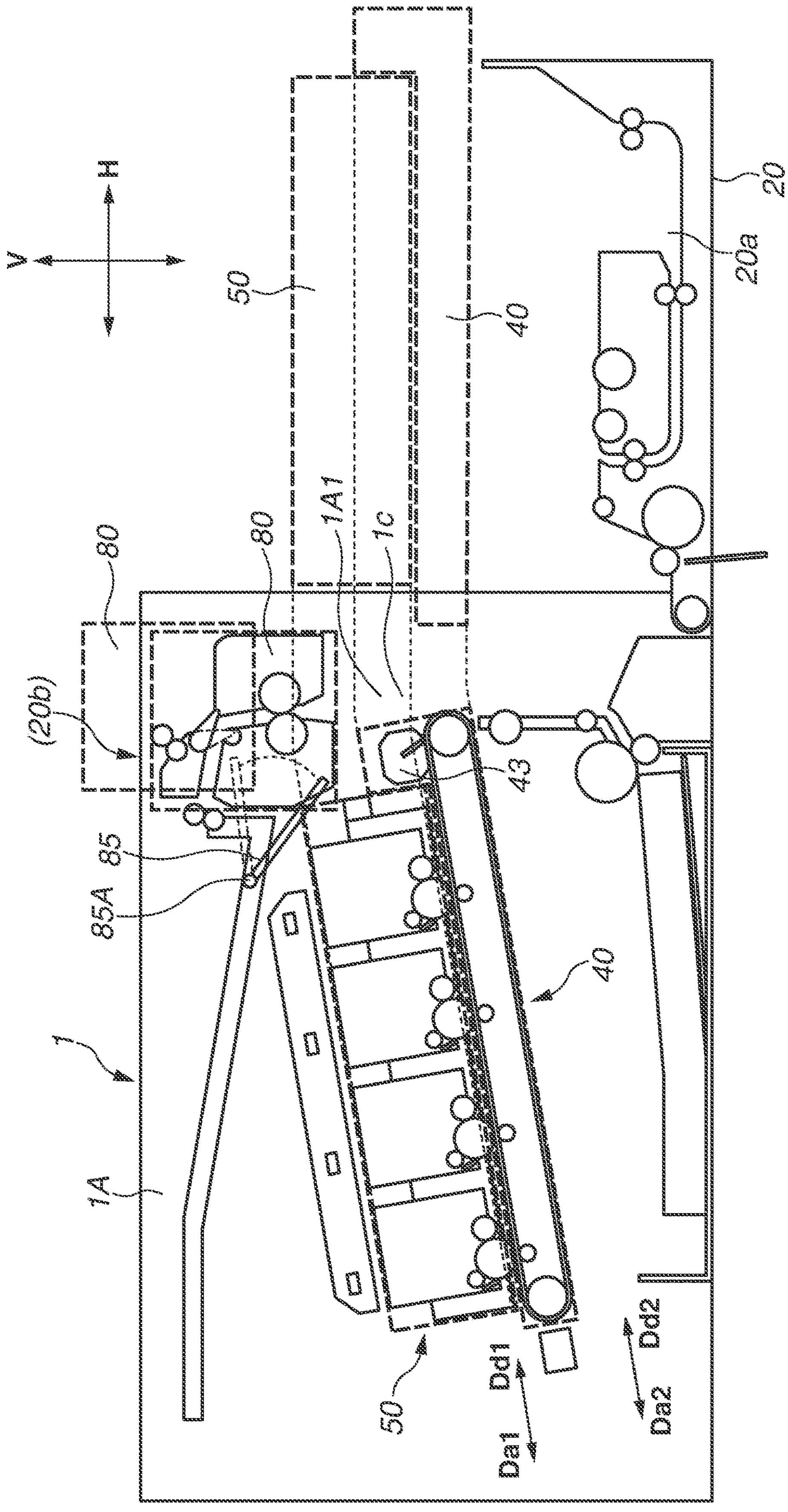
FIG. 7 illustrates the movement of the transfer unit and the tray unit according to the first exemplary embodiment.

A relationship between the tray unit 50 and the fixing device 80 will be described with reference to FIGS. 1, 2, 3, 4, 6, and 7. FIGS. 6 and 7 illustrate the movement of the transfer unit 40 and the tray unit 50.

The tray unit 50 passes through a predetermined space when being moved between the first inner position where the image forming operation is performed on a sheet S and the first outer position where the cartridges P can be replaced.

The space for the tray unit 50 to pass through in being moved from the first inner position to the first outer position will be referred to as a first space (moving space of the tray unit 50). The first space can also be referred to as a path or locus (first moving path or first moving locus) for the tray unit 50 to pass through in being moved from the first inner position to the first outer position.

The transfer unit 40 passes through a predetermined space when being moved between the second inner position where the image forming operation is performed on a sheet S and the second outer position. The space for the transfer unit 40 to pass through in being moved from the second inner position to the second outer position will be referred to as a second space (moving space of the transfer unit 40). The second space can also be referred to as a path or locus (second moving path or second moving locus) for the transfer unit 40 to pass through in being moved from the second inner position to the second outer position.

The position of the fixing device 80 in performing the image forming operation on a sheet S (use position), the first space, and the second space have the following relationship.

As illustrated in FIGS. 6 and 7, at least a part of the fixing device 80 at the use position overlaps with the first space. In other words, with the fixing device 80 at the use position, at least a part of the fixing device 80 is located in the first space.

In the present exemplary embodiment, at least a part of the fixing device 80 overlaps with the space for the cartridges P to pass through when the tray unit 50 is moved from the first inner position to the first outer position. However, at least a part of the fixing device 80 may be positioned to overlap with the space for the tray 51 to pass through.

This enables the miniaturization of the apparatus main body 1A as compared to a configuration where the fixing device 80 at the use position is located outside the first space.

As illustrated in FIG. 6, in the present exemplary embodiment, at least a part of the two-sided conveyance path 20*a* overlaps with the first space when the door 20 is in the closed state. In other words, with the door 20 in the closed state, at least a part of the two-sided conveyance path 20*a* is located in the first space.

As described above, at least a part of the fixing device 80 at the use position is located in the first space. With the fixing device 80 at the use position, the movement of the tray unit 50 from the first inner position to the first outer position is thus restricted. Meanwhile, the fixing device 80 is configured to be retractable from the use position. With the fixing device 80 retraced from the use position, the tray unit 50 can be moved from the first inner position to the first outer position. When the tray unit 50 is moved from the first inner position to the first outer position, the tray unit 50 passes under the fixing device 80. The fixing device 80, whether at the use position or the retracted position, is located outside the second space. In both the state where the fixing device 80 is at the use state and the state where the fixing device 80 is at the retracted position, the transfer unit 40 can thus be moved from the second inner position to the second outer position. When the transfer unit 40 is moved from the second inner position to the second outer position, the transfer unit 40 passes under the fixing device 80.

The fixing device 80 includes a fixing frame 80*a* that supports the fixing unit 81. When the fixing device 80 is retracted from the use position, the fixing frame 80*a* is displaced with respect to the apparatus main body 1A while supporting the fixing unit 81.

In pulling the tray unit 50 out of the apparatus main body 1A, the door 20 is initially moved to the open position as illustrated in FIG. 2. In the present exemplary embodiment, with the fixing device 80 at the use position, the door 20 can be moved to the open position and the closed position. With the door 20 at the open position, the fixing device 80 is moved from the use position to the retracted position to exit the first space as illustrated in FIG. 3.

In the printer 1 according to the present exemplary embodiment, the fixing device 80 can be moved between the use position and the retracted position retracted from the use position while attached to the apparatus main body 1A. In the present exemplary embodiment, with the fixing device 80 at the retracted position, the entire fixing device 80 is located outside the first space. The fixing device 80 is lifted from the use position to the retracted position above the use position. In other words, the retracted position is a position higher than the use position. As illustrated in FIG. 7, with the fixing device 80 at the retracted position, at least a part of the fixing device 80 is positioned at a position protruding outward from the apparatus main body 1A. Moreover, with the fixing device 80 at the retracted position, the position of at least a part of the fixing device 80 is higher than that of the upper cover portion 20*b* of the door 20 at the closed position. This can maintain the size of the printer 1 in a vertical direction V with the fixing device 80 at the use position small while the movement of the fixing device 80 to the retracted position provides a space for the tray unit 50 to move. With the fixing device 80 at the retracted position, the door 20 is prevented from taking the closed position.

Specifically, the printer 1 includes a coupling member (fixing coupling member, fixing link, or arm) 85 movably coupled to the apparatus main body 1A. The fixing device 80 is coupled to the apparatus main body 1A via the coupling member 85.

The coupling member 85 can be rotated about a rotation center 85A. In pulling the tray unit 50 out of the apparatus main body 1A, the coupling member 85 is moved out of the first space. The fixing device 80 is rotatably connected to one end of the coupling member 85. The other end of the coupling member 85 is connected to the apparatus main body 1A rotatably about the rotation center 85A. The fixing device 80 can be moved from the use position to the retracted position and from the retracted position to the use position while being supported by the coupling member 85 (state of being coupled to the apparatus main body 1A via the coupling member 85). The coupling member 85 is configured to be movable (swingable) with respect to the apparatus main body 1A and the fixing device 80. In other words, the fixing device 80 is connected to the apparatus main body 1A via the coupling member 85. This can increase the amount of movement of the fixing device 80 when the fixing device 80 is moved between the retracted position and the use position, as compared to a configuration where the fixing device 80 is directly connected to the apparatus main body 1A.

As illustrated in FIG. 7, when the tray unit 50 is moved from the first inner position to the first outer position, the angle formed between the moving direction of the tray unit 50 and the horizontal direction H is smaller than that formed between the moving direction of the tray unit 50 and the vertical direction V. Moreover, when the fixing device 80 is moved from the use position to the retracted position, the amount of movement of the fixing device 80 in the vertical direction V is greater than that in the horizontal direction H. In other words, when the fixing device 80 is moved from the use position to the retracted position, the amount of movement of the fixing device 80 in the direction perpendicular to the moving direction of the tray unit 50 is greater than that in the direction parallel to the moving direction of the tray unit 50.

Moreover, the fixing device 80 may be configured to be moved to the use position and the retracted position while being attached to the apparatus main body 1A via a guide fixed to the apparatus main body 1A. In such a case, the guide may have any given shape.

The method for moving the fixing device 80 out of the first space is not limited thereto. For example, the fixing device 80 may be configured to be detachable from the apparatus main body 1A when retracted from the use position, and the fixing device 80 may thereby be moved out of the first space. In other words, the fixing device 80 may be positioned outside the first space by separating the fixing device 80 from the apparatus main body 1A and the door 20 (separating the fixing device 80 from the main frame 100). Alternatively, the fixing device 80 may be coupled to the door 20 so that the fixing device 80 is moved out of the first space by opening the door 20.

[Relationship Between Tray Unit and Transfer Unit]

A relationship between the tray unit 50 and the transfer unit 40 will be described with reference to FIGS. 1, 2, 3, 4, 5, 6, and 7.

As illustrated in FIG. 3, with the fixing device 80 positioned outside the first space, the user grips the tray handle 52 and moves the tray unit 50 to outside the apparatus main body 1A.

As illustrated in FIGS. 6 and 7, the position of the transfer unit 40 in performing the image forming operation on the sheet S and the first space have the following relationship.

In performing the image forming operation on the sheet S, the transfer unit 40 is at the second inner position. As illustrated in FIGS. 6 and 7, at least a part of the transfer unit 40 at the second inner position overlaps with the first space. In other words, with the transfer unit 40 at the second inner position, at least a part of the transfer unit 40 is located in the first space.

In the present exemplary embodiment, at least a part of the transfer unit 40 overlaps with the space for the tray 51 to pass through when the tray unit 50 is moved from the first inner position to the first outer position. However, at least a part of the transfer unit 40 may be positioned overlapping with a space for the cartridges P to pass through.

The apparatus main body 1A can thus be reduced in size as compared to a configuration where the transfer unit 40 at the second inner position is located outside the first space.

In the printer 1 according to the present exemplary embodiment, the part of the transfer unit 40 overlapping with the first space refers to the cleaning unit 43 accommodating the cleaning member 43A. However, other parts of the transfer unit 40 may overlap with the first space. In the present exemplary embodiment, the cleaning member 43A of the transfer unit 40 at the second inner position overlaps with the first space.

The tray unit 50 and the transfer unit 40 can be said to satisfy the following relationship.

In the state where the tray unit 50 is at the first inner position and the transfer unit 40 is at the second inner position, a part of the transfer unit 40 (cleaning unit 43) is located downstream of the tray unit 50 in the moving direction where the tray unit 50 is moved from the first inner position to the first outer position. In the vertical direction V, an area (range) where the part of the transfer unit 40 (cleaning unit 43) downstream of the tray unit 50 is positioned overlaps at least in part with an area (range) where the tray unit 50 is positioned.

In the present exemplary embodiment, when the door 20 is in the closed state, at least a part of the two-sided conveyance path 20*a* overlaps with the second space for the transfer unit 40 to pass through in being moved from the second inner position to the second outer position. In other words, when the door 20 is in the closed state, at least a part of the two-sided conveyance path 20*a* is located in the second space.

As described, with the transfer unit 40 at the second inner position, at least a part of the transfer unit 40 is located in the first space. In the present exemplary embodiment, when the user moves the tray unit 50 with respect to the apparatus main body 1A from the first inner position to the first outer position, the transfer unit 40 is thus also moved with respect to the apparatus main body 1A from the second inner position to the second outer position. In other words, the tray unit 50 is moved from the first inner position to the first outer position and the transfer unit 40 from the second inner position to the second outer position in a state where the transfer unit 40 and the tray unit 50 are integrated with each other.

The integral movement of the tray unit 50 and the transfer unit 40 can prevent the photosensitive drums 61 from being exposed when the tray unit 50 is moved to the first outer position, and can prevent damage or stain to the photosensitive drums 61.

As illustrated in FIG. 7, with the door 20 open, the tray unit 50 at the first outer position, and the transfer unit 40 at the second outer position, the transfer unit 40 supports the tray unit 50 from below the tray unit 50. Moreover, in the present exemplary embodiment, the door 20 supports the transfer unit 40. In other words, the transfer unit 40 supported by the door 20 supports the tray unit 50. In such a state, the door 20 can be said to support the tray unit 50 via the transfer unit 40.

Figure 8:
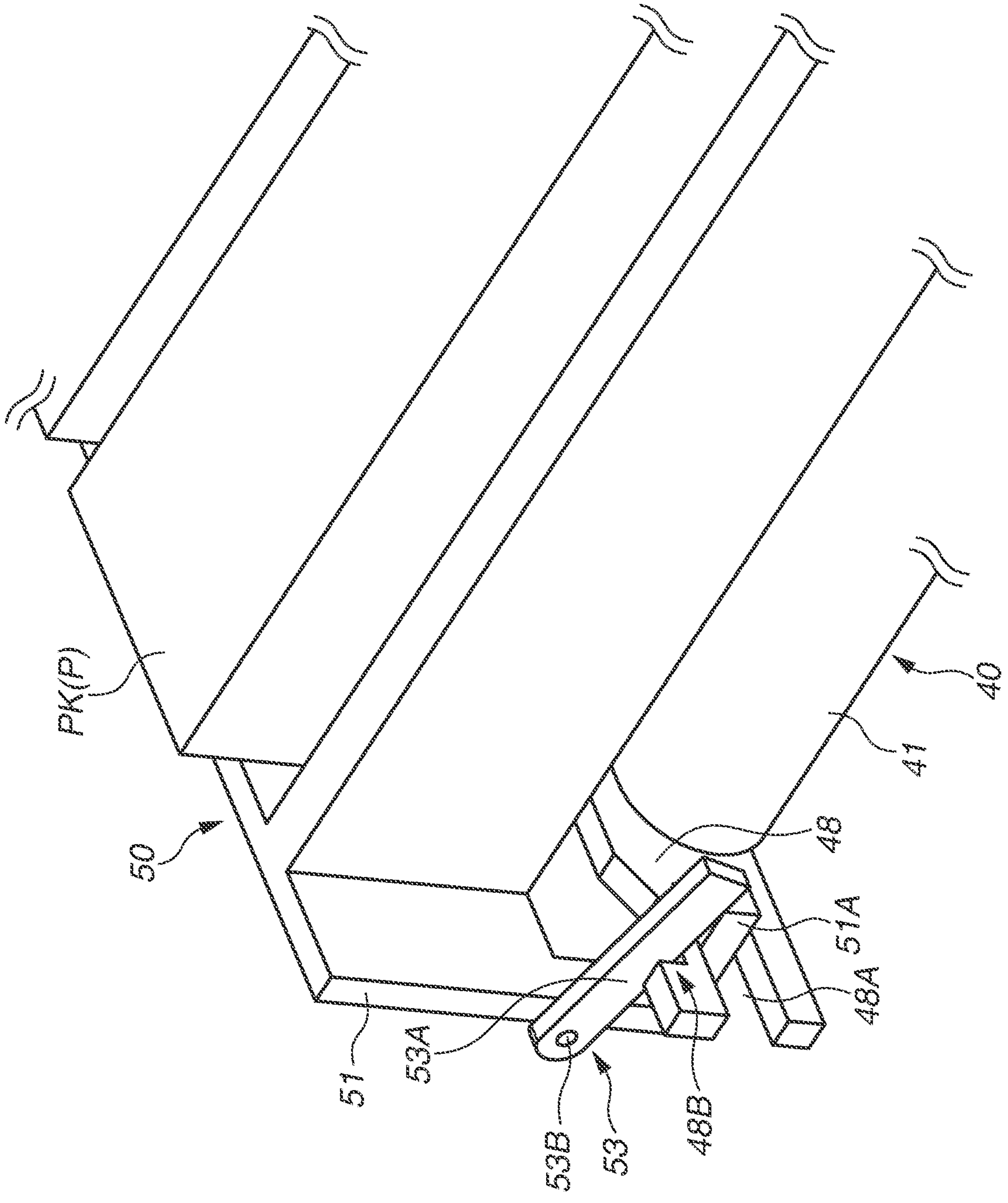
FIG. 8 illustrates a coupling member that couples a tray of the tray unit with the transfer unit according to the first exemplary embodiment.
Figure 9:
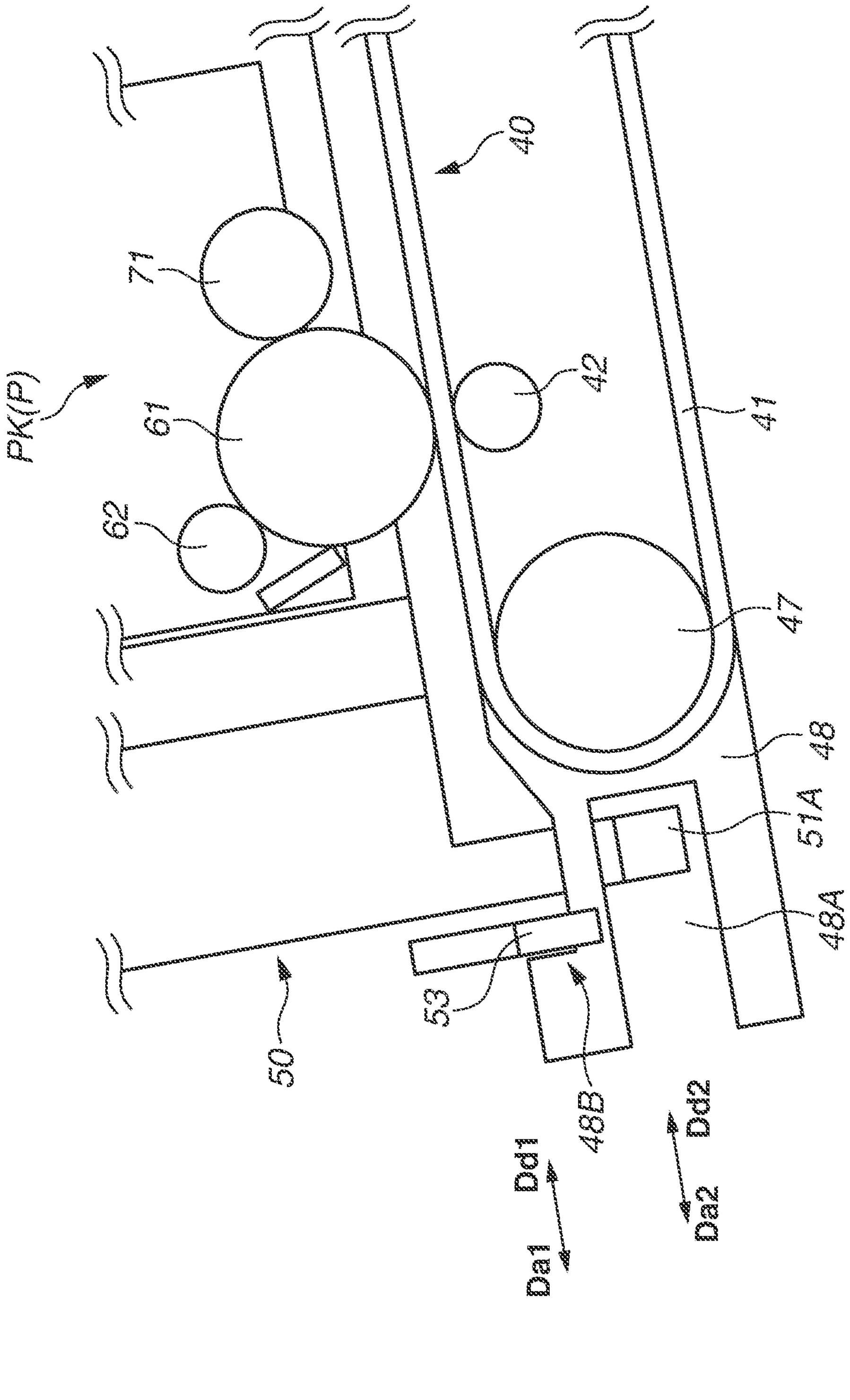
FIG. 9 illustrates the coupling member that couples the tray of the tray unit with the transfer unit according to the first exemplary embodiment.
Figure 10:
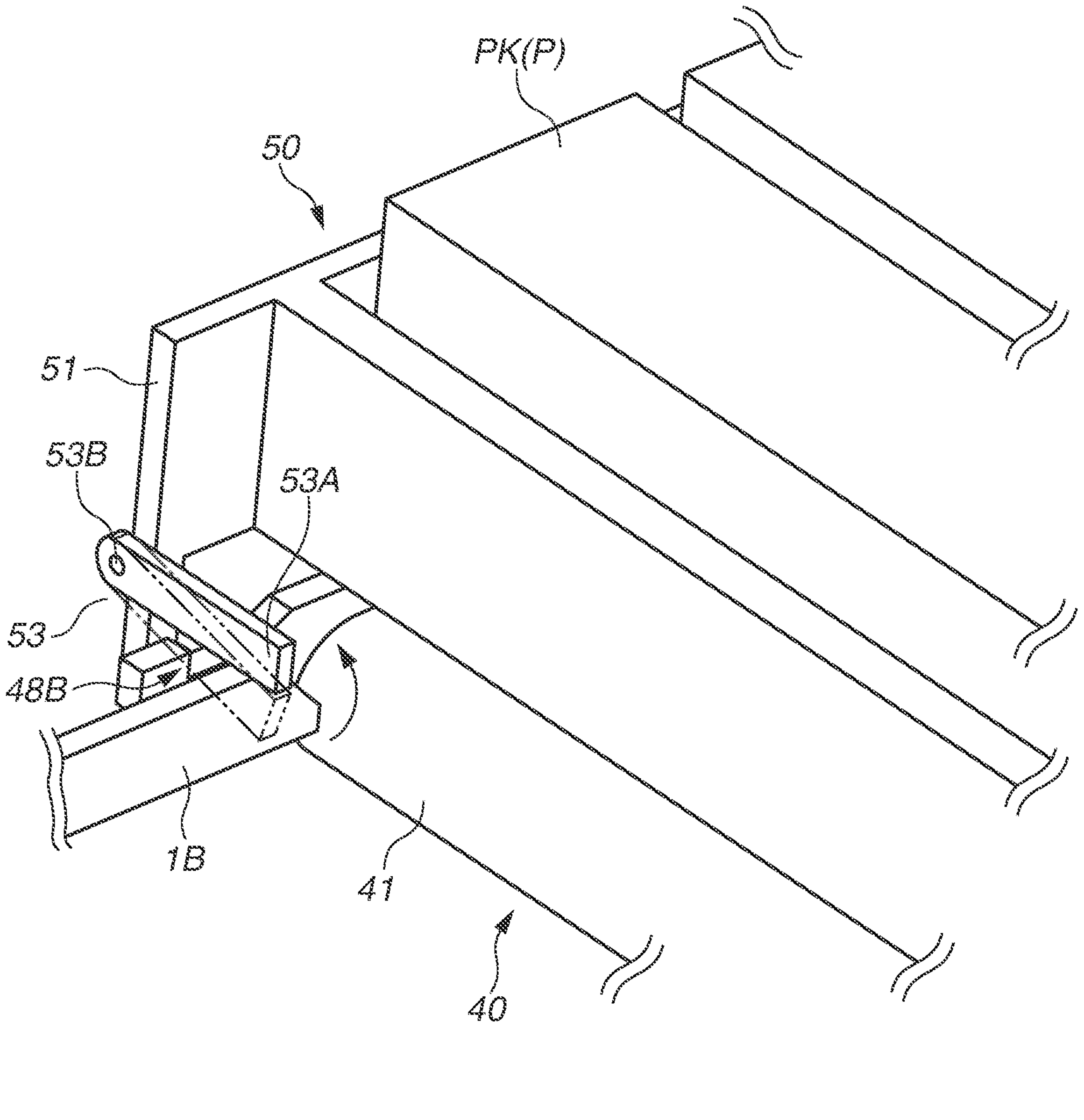
FIG. 10 illustrates the coupling member that couples the tray of the tray unit with the transfer unit according to the first exemplary embodiment.

A configuration for integrally moving the tray unit 50 and the transfer unit 40 will be described with reference to FIGS. 8, 9, and 10. FIGS. 8, 9, and 10 illustrate a coupling member (lever, stopper, or lock member) 53 that couples the tray 51 of the tray unit 50 with the transfer unit 40.

The printer 1 according to the present exemplary embodiment includes the lock member 53. In the present exemplary embodiment, the lock member 53 is disposed on the tray 51 of the tray unit 50. The lock member 53 includes a transfer lock portion 53A, and can be rotated about a rotation center 53B.

The tray 51 includes a transfer coupling portion 51A. The transfer unit 40 includes a transfer frame 48 that supports the driving roller 46, the tension roller 47, and the primary transfer rollers 42. The transfer frame 48 includes a tray coupling groove 48A and a lock coupling portion 48B.

The lock member 53 can be rotated about the rotation center 53B into a coupling position where the transfer lock portion 53A is engaged with the lock coupling portion 48B and the transfer unit 40 is coupled with the tray unit 50, and into a release position retracted from the coupling position.

The tray coupling groove 48A is engaged with the transfer coupling portion 51A, whereby the movement of the tray unit 50 with respect to the transfer unit 40 in the first detachment direction Dd1 and a direction orthogonal to the first detachment direction Dd1 is restricted. Meanwhile, the movement of the transfer unit 40 with respect to the tray unit 50 in the second attachment direction Da2 and a direction orthogonal to the second attachment direction Da2 is restricted.

Similar configurations are provided at a total of four locations, namely, near both ends of the tension roller 47 in the direction of the rotation axis of the tension roller 47 and near both ends of the driving roller 46 in the direction of the rotation axis of the driving roller 46.

The engagement of the transfer lock portion 53A of the lock member 53 at the coupling position with the lock coupling portion 48B restricts the movement of the tray unit 50 with respect to the transfer unit 40 in the first detachment direction Da1. Meanwhile, the movement of the transfer unit 40 with respect to the tray unit 50 in the second detachment direction Dd2 is restricted.

The lock member 53 and the lock coupling portion 48B may also be disposed at both ends of the transfer unit 40 in the direction of the rotation axis of the tension roller 47.

In the state where the transfer coupling portion 51A is engaged with the tray coupling groove 48A and the lock member 53 at the coupling position is engaged with the lock coupling portion 48B, the movement of the transfer unit 40 and the tray unit 50 with respect to each other is restricted. In this state, the transfer unit 40 and the tray unit 50 may have some play.

In other words, the transfer coupling portion 51A and the lock member 53 can be said to have a function as a tray-side coupling device, and the tray coupling groove 48A and the lock coupling portion 48B have a function as a transfer-side coupling device. The coupling of the tray- and transfer-side coupling devices couples the tray unit 50 with the transfer unit 40, and the tray unit 50 and the transfer unit 40 are moved integrally.

As illustrated in FIG. 10, the apparatus main body 1A includes an unlocking portion 1B. In the state where the tray unit 50 is at the first inner position and the transfer unit 40 is at the second inner position, the lock member 53 is in contact with the unlocking portion 1B and positioned at an unlocked position. In such a state, the transfer lock portion 53A is separated from the lock coupling portion 48B.

If the tray unit 50 is moved in the first detachment direction Dd1 with the lock member 53 at the unlocked position, the transfer unit 40 is pushed in the second detachment direction Dd2 by the transfer coupling portion 51A. As a result, the transfer unit 40 is also moved in the second detachment direction Dd2 integrally with the tray unit 50. If the tray unit 50 is moved in the first detachment direction Dd1 by a predetermined distance, the lock member 53 gets separated from the unlocking portion 1B and is moved to the coupling position, and is engaged with the lock coupling portion 48B. The tray unit 50 is moved to the first outer position and the transfer unit 40 to the second outer position with the lock member 53 positioned at the coupling position and engaged with the lock coupling portion 48B.

If the tray unit 50 is moved in the first attachment direction Da1 with the lock member 53 engaged with the lock coupling portion 48B, the transfer unit 40 is pushed in the second attachment direction Da2 by the lock member 53. As a result, the transfer unit 40 is also moved in the second attachment direction Da2 integrally with the tray unit 50.

If the transfer unit 40 is moved in the second attachment direction Da2 with the lock member 53 engaged with the lock coupling portion 48B, the transfer unit 40 pushes the transfer coupling portion 51A, and the tray unit 50 is pushed in the first attachment direction Da1. As a result, the tray unit 50 is also moved in the first attachment direction Da1 integrally with the transfer unit 40.

If the tray unit 50 and the transfer unit 40 are integrally moved into the apparatus main body 1A, the lock member 53 is moved to the unlocked position by the unlocking portion 1B. If the tray unit 50 is moved in the first attachment direction Da1 in such a state, the transfer unit 40 is not moved. Then, as the door 20 is being closed, the transfer unit 40 is fully pushed into the apparatus main body 1A (up to the second inner position) in the second attachment direction Da2 by the contact force of the secondary transfer roller 45 with the transfer unit 40. In other words, the door 20 can push the transfer unit 40 so that the transfer unit 40 is positioned at the second inner position. The door 20 may also push the tray unit 50 so that the tray unit 50 is positioned at the first inner position.

Now, if the transfer unit 40 is moved in the second detachment direction Dd2 with the lock member 53 at the unlocked position and the tray unit 50 at the first inner position, the transfer unit 40 can be moved from the second inner position to the second outer position independent of the tray unit 50. In the printer 1 according to the present exemplary embodiment, as illustrated in FIG. 5, the transfer unit 40 can be moved out of the apparatus main body 1A (to the second outer position) with the tray unit 50 positioned inside the apparatus main body 1A (at the first inner position). The transfer unit 40 can be detached from the apparatus main body 1A and replaced with a new transfer unit 40.

In the present exemplary embodiment, in a state where the tray unit 50 is at the first inner position, the tray unit 50 is positioned to the apparatus main body 1A independent of the transfer unit 40. In a state where the transfer unit 40 is at the second inner position, the transfer unit 40 is positioned to the apparatus main body 1A independent of the tray unit 50. The purpose is to give priority to accurate positioning of the transfer unit 40 and the tray unit 50 with respect to the apparatus main body 1A. In the state where the tray unit 50 is at the first inner position and the transfer unit 40 is at the second inner position, there is therefore some clearance between the tray coupling groove 48A and the transfer coupling portion 51A.

The clearance between the tray coupling groove 48A and the transfer coupling portion 51A may be eliminated so that the tray unit 50 and the transfer unit 40 can be positioned to each other in the state where the tray unit 50 is at the first inner position and the transfer unit 40 is at the second inner position. In such a case, the transfer unit 40 and the tray unit 50 can be accurately positioned to each other.

[Movement of Tray Unit and Transfer Unit]

As illustrated in FIGS. 1, 6, and 7, the tray unit 50 and the transfer unit 40 while being attached to the apparatus main body 1A are tilted with respect to the horizontal direction H.

More specifically, with the tray unit 50 at the first inner position, the rotation axes of photosensitive drums 61 closer to the first end 1*b*1 is located, in the vertical direction V, above those of photosensitive drums 61 farther from the first end 1*b*1.

In other words, with the tray unit 50 at the first inner position, the second photosensitive drum is closer to the first end 1*b*1 than the first photosensitive drum is, and the rotation axis of the second photosensitive drum is located above that of the first photosensitive drum in the vertical direction V. Similarly, the third photosensitive drum is closer to the first end 1*b*1 than the second photosensitive drum is, and the rotation axis of the third photosensitive drum is located above that of the second photosensitive drum in the vertical direction V. The fourth photosensitive drum is closer to the first end 1*b*1 than the third photosensitive drum is, and the rotation axis of the fourth photosensitive drum is located above that of the third photosensitive drum in the vertical direction V.

A straight line connecting the centers of the photosensitive drums 61 will be referred to as a line LD. In the present exemplary embodiment, when the tray unit 50 is at the first inner position, the line LD is tilted upward with respect to the horizontal direction H from the side farther from the first end position 1*b*1 to the side closer to the first end 1*b*1.

Moreover, the contact surface of the belt 41 to contact the first, second, third, and fourth photosensitive drums is tilted upward from the side farther from the first end 1*b*1 to the side closer to the first end 1*b*1.

When the tray unit 50 is moved from the first inner position to the first outer position, the tray unit 50 is moved in a direction oblique to the horizontal direction H (in the present exemplary embodiment, a direction tilted upward with respect to the horizontal direction H). In other words, when the tray unit 50 is moved from the first inner position to the first outer position, the tray unit 50 is moved obliquely upward.

When the tray unit 50 is moved from the first inner position to the first outer position, the moving direction of the tray unit 50 lowers from obliquely upward. The moving direction of the tray unit 50 may include a direction parallel to the horizontal direction H or obliquely downward with respect to the horizontal direction H.

The angle formed between the line LD and the horizontal direction H is smaller when the tray unit 50 is at the first outer position than when the tray unit 50 is at the first inner position. In the present exemplary embodiment, when the tray unit 50 is at the first outer position, the line LD and the horizontal direction H are parallel. However, the line LD may be tilted downward or upward with respect to the horizontal direction H.

Similarly, when the transfer unit 40 is moved from the second inner position to the second outer position, the moving direction of the transfer unit 40 lowers from obliquely upward. The moving direction of the transfer unit 40 may include a direction parallel to the horizontal direction H or obliquely downward with respect to the horizontal direction H.

The angle formed between the contact surface of the belt 41 and the horizontal direction H is smaller when the transfer unit 40 is at the second outer position than when the transfer unit 40 is at the second inner position. In the present exemplary embodiment, when the transfer unit 40 is at the second outer position, the contact surface of the belt 41 and the horizontal direction H are parallel. However, the contact surface of the belt 41 may be tilted downward or upward with respect to the horizontal direction H.

If the tray unit 50 is moved from the first outer position to the first inner position, the tray unit 50 is moved in the horizontal direction H and then obliquely downward from the middle. If the transfer unit 40 is moved from the second outer position to the second inner position, the transfer unit 40 is moved in the horizontal direction H and then obliquely downward from the middle. According to such a configuration, the own weights of the tray unit 50 and the transfer unit 40 can be used in inserting the tray unit 50 and the transfer unit 40 into the apparatus main body 1A.

(Modifications)

As described above, the photosensitive drums 61, the charging rollers 62, and the developing rollers 71 may be disposed on either the cartridges P or the tray 51. A description thereof will be given with reference to FIGS. 11A to 11D. FIGS. 11A to 11D are diagrams illustrating the tray unit 50 according to modifications.

Figure 11A:
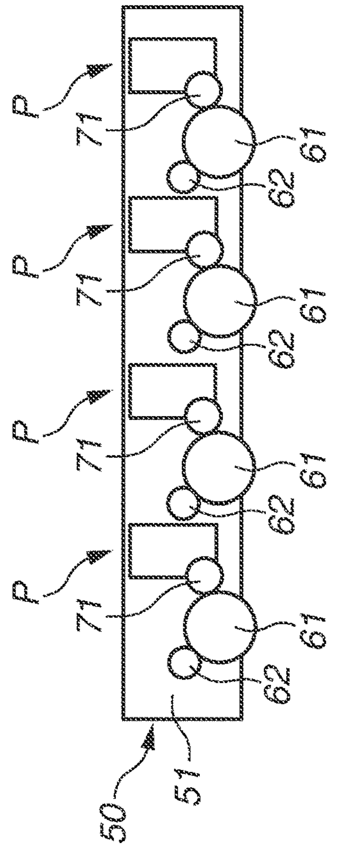
FIGS. 11A to 11D illustrate a tray unit according to modifications.

For example, as illustrated in FIG. 11A, the tray 51 may include the photosensitive drums 61 and the charging rollers 62, and the cartridges P may include the developing rollers 71.

Figure 11B:
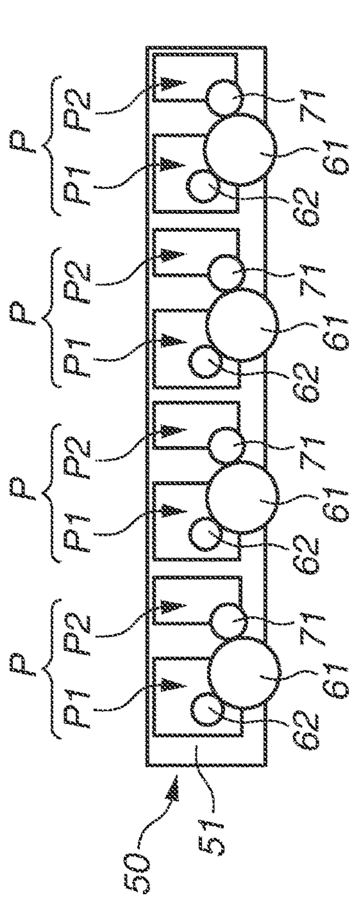

As illustrated in FIG. 11B, the cartridges P may include drum cartridges P1 including the photosensitive drums 61 and the charging rollers 62, and developing cartridges P2 including the developing rollers 71. In other words, the cartridges P may be separable into the drum cartridges P1 and the developing cartridges P2. In such a case, the drum cartridges P1 and the developing cartridges P2 can be detachably attachable to the tray 51 independent of each other.

Figure 11C:
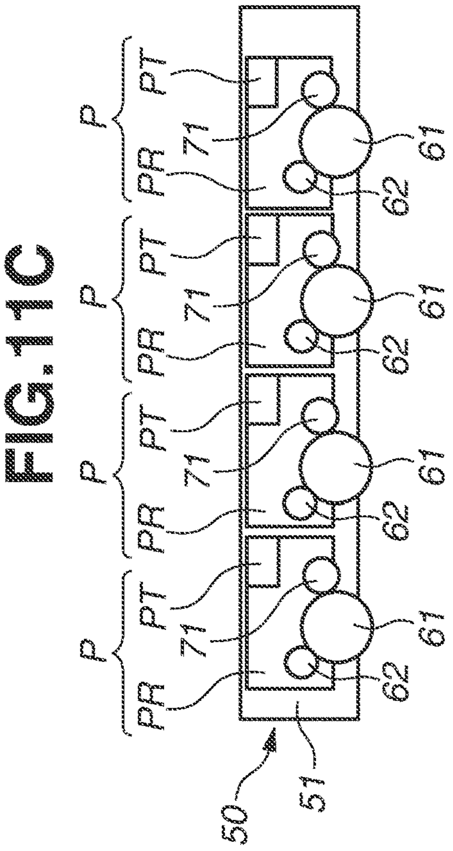

As illustrated in FIG. 11C, the cartridges P may include cartridges PR including the photosensitive drums 61, the charging rollers 62, and the developing rollers 71, and cartridges PT including toners to be replenished into the cartridges PR. In other words, the cartridges P may be separable into the cartridges PR and the cartridges PT.

Figure 11D:
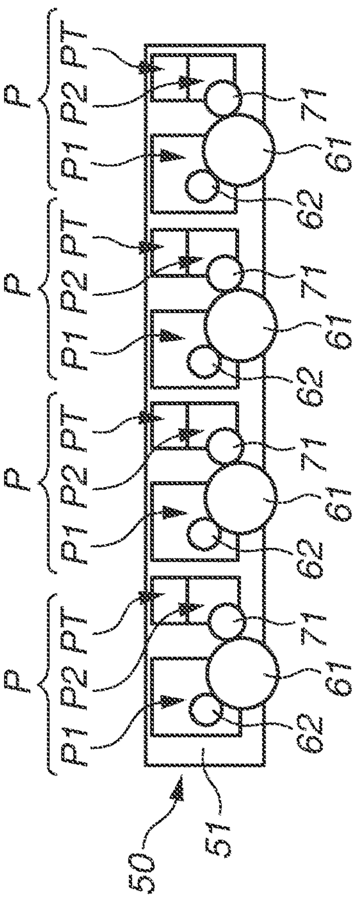

As illustrated in FIG. 11D, the cartridges P may include drum cartridges P1 including the photosensitive drums 61 and the charging rollers 62, developing cartridges P2 including the developing rollers 71, and cartridges PT including toners to be replenished into the developing cartridges P2. In other words, the cartridges P may be separable into the drum cartridges P1, the developing cartridges P2, and the cartridges PT.

A second exemplary embodiment will be described. In the second exemplary embodiment, components similar to those described in the foregoing exemplary embodiment are denoted by the same reference numerals as used in the exemplary embodiment. A description of the components similar to those of the exemplary embodiment may be omitted.

[Relationship Between Tray Unit and Transfer Unit]

A printer 101 that is an image forming apparatus according to the present exemplary embodiment includes an apparatus main body 101A provided with an opening 101A1. The printer 101, the apparatus main body 101A, and the opening 101A1 correspond to the printer 1, the apparatus main body 1A, and the opening 1A1 of the first exemplary embodiment, respectively.

In the present exemplary embodiment, as in the first exemplary embodiment, with the transfer unit 40 at the second inner position, at least a part of the transfer unit 40 is located in the first space for the tray unit 50 to pass through in being moved from the first inner position to the first outer position. In the first exemplary embodiment, the tray unit 50 is configured to be moved out of the apparatus main body 1A along with the transfer unit 40. In the printer 101 according to the present exemplary embodiment, the transfer unit 40 can be moved so that a part of the transfer unit 40 (specifically, the cleaning unit 43) is positioned outside the first space. With the part of the transfer unit 40 retracted from the first space, the tray unit 50 is moved out of the apparatus main body 101A.

Figure 12:
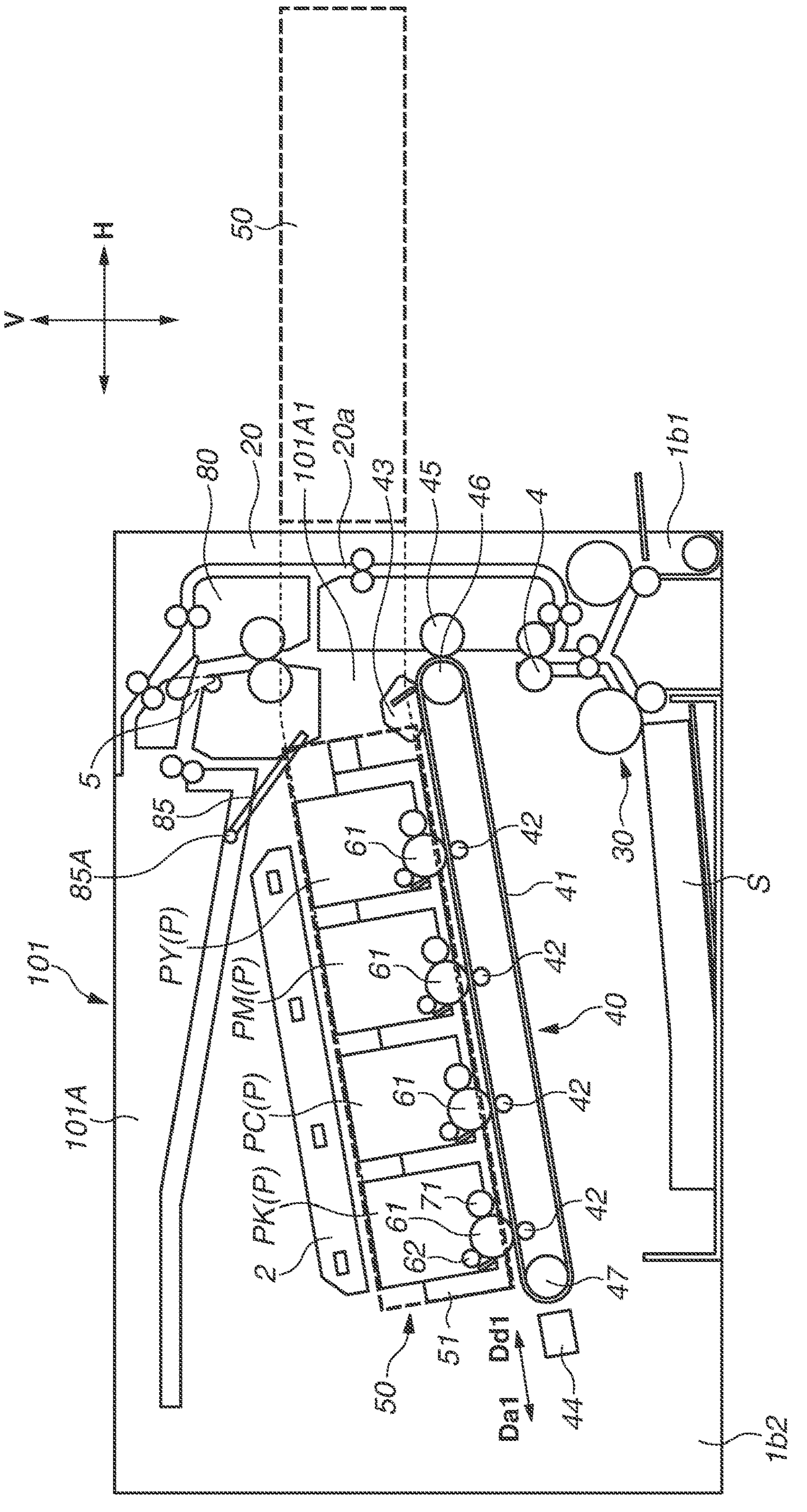
FIG. 12 illustrates the overall configuration of a printer according to a second exemplary embodiment.
Figure 13:
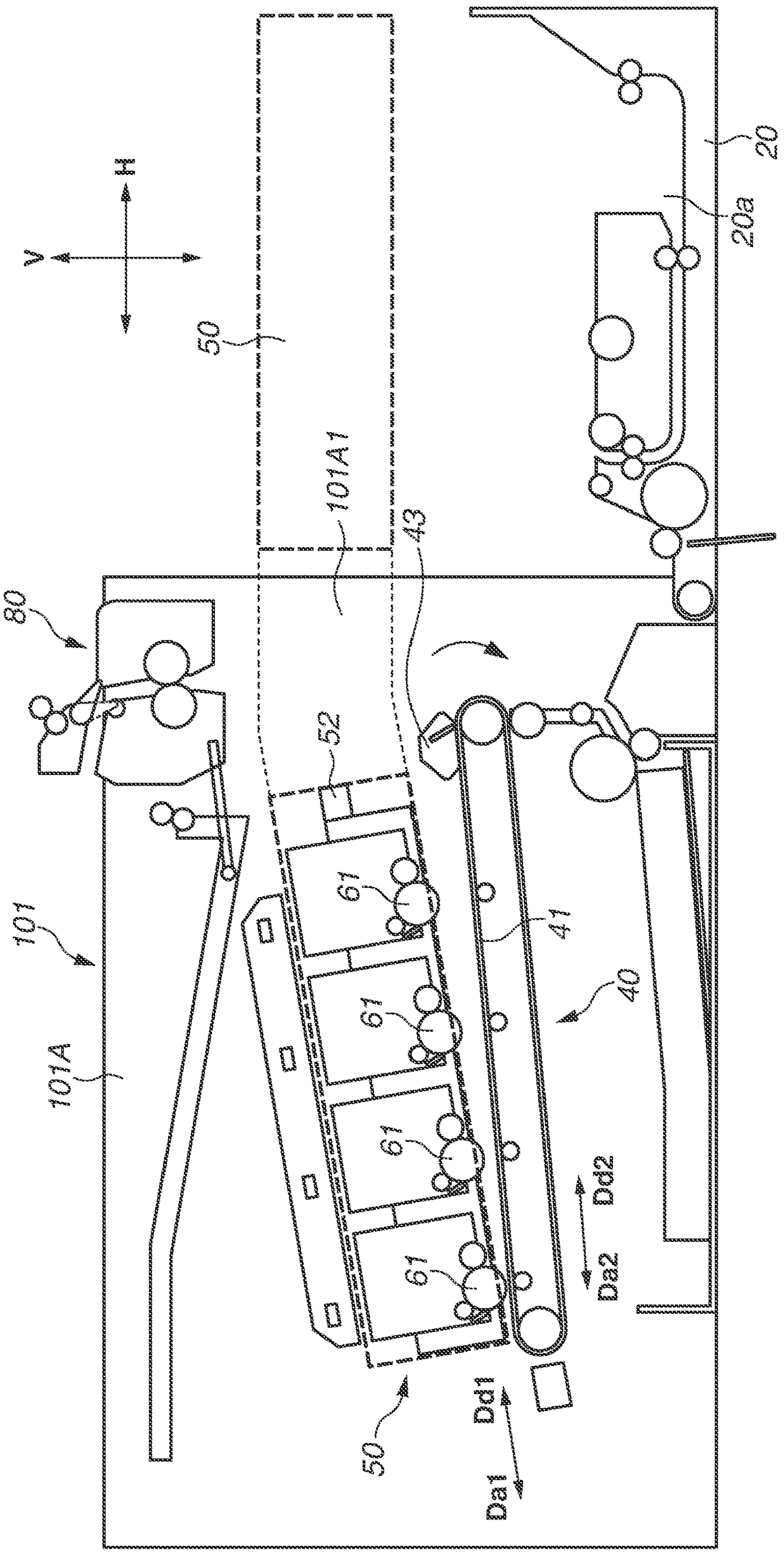
FIG. 13 is a diagram illustrating the printer according to the second exemplary embodiment with a door, a fixing device, and a transfer unit moved.
Figure 14:
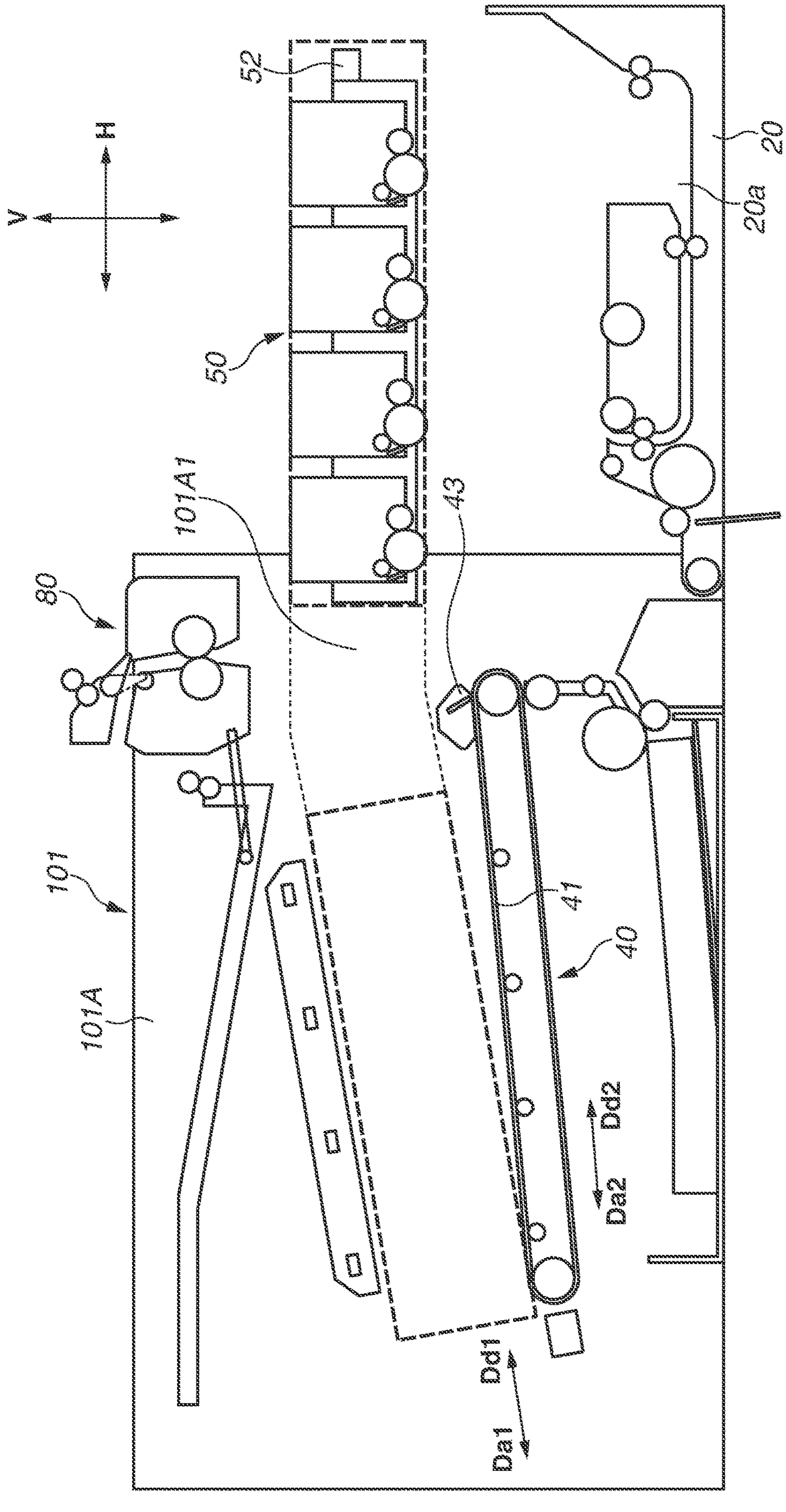
FIG. 14 is a diagram illustrating the printer according to the second exemplary embodiment with a tray unit pulled out.

A relationship between the tray unit 50 and the transfer unit 40 will be described with reference to FIGS. 12, 13, and 14. FIG. 12 illustrates an overall configuration of the printer 101 according to the second exemplary embodiment. FIG. 13 is a diagram illustrating the printer 101 with the door 20, the fixing device 80, and the transfer unit 40 moved. FIG. 14 is a diagram illustrating the printer 101 with the tray unit 50 pulled out.

As in the first exemplary embodiment, before the tray unit 50 is moved, the door 20 and the fixing device 80 are retracted from the first space. Specifically, after the door 20 is moved to the open position, the fixing device 80 is moved from the use position to the retracted position. In the present exemplary embodiment, the transfer unit 40 is further tilted away from the tray unit 50 as illustrated in FIG. 13. As a result, the cleaning unit 43 that is a part of the transfer unit 43 is moved out of the first space. In such a state, the belt 41 is separated from the photosensitive drums 61.

The user then grips the tray handle 52 and moves the tray unit 50 to outside the apparatus main body 101A, whereby the tray unit 50 as illustrated in FIG. 14 can be pulled out of the apparatus main body 101A through the opening 101A1.

According to the configuration of the present exemplary embodiment, the tray unit 50 can be moved out of the apparatus main body 101A (to the first outer position) with the transfer unit 40 positioned inside the apparatus main body 101A. Moreover, the transfer unit 40 can be moved to the second outer position with the tray unit 50 at the first inner position. The tray unit 50 can thus be moved by a small force as compared with a configuration where the tray unit 50 is moved out of the apparatus main body 101A along with the transfer unit 40. Again, in the present exemplary embodiment, the tray unit 50 passes under the fixing device 80 when being moved from the first inner position to the first outer position. The transfer unit 40 passes under the fixing device 80 when being moved from the second inner position to the second outer position.

A third exemplary embodiment will be described. In the third exemplary embodiment, components similar to those described in the foregoing exemplary embodiments are denoted by the same reference numerals as used in the exemplary embodiments. A description of the components similar to those of the exemplary embodiments may be omitted.

[Relationship Between Tray Unit and Transfer Unit]

A printer 201 that is an image forming apparatus according to the present exemplary embodiment includes an apparatus main body 201A provided with an opening 201A1. The printer 201, the apparatus main body 201A, and the opening 201A1 correspond to the printer 1, the apparatus main body 1A, and the opening 1A1 of the first exemplary embodiment, respectively.

In the present exemplary embodiment, as in the first and second exemplary embodiments, with the transfer unit 40 at the second inner position, at least a part of the transfer unit 40 is located in the first space for the tray unit 50 to pass through in being moved from the first inner position to the first outer position.

In the printer 201 of the present exemplary embodiment, a part of the transfer unit 40 (cleaning unit 43) can be moved with respect to the belt 41 so that the part of the transfer unit 40 (cleaning unit 43) is positioned outside the first space for the tray unit 50 to pass through in being moved from the first inner position to the first outer position.

Figure 15:
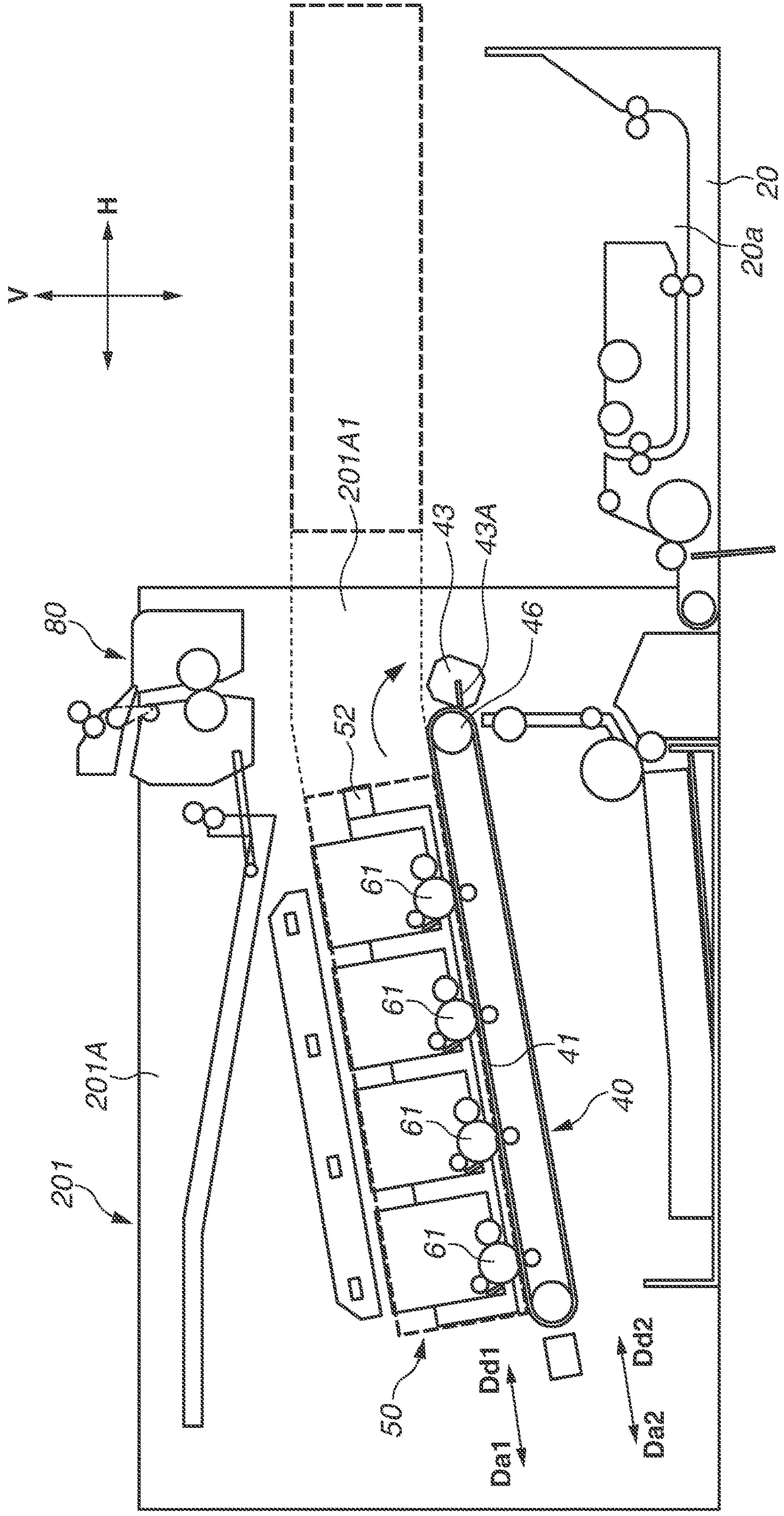
FIG. 15 is a diagram illustrating a printer according to a third exemplary embodiment with a door, a fixing device, and a cleaning unit moved.
Figure 16:
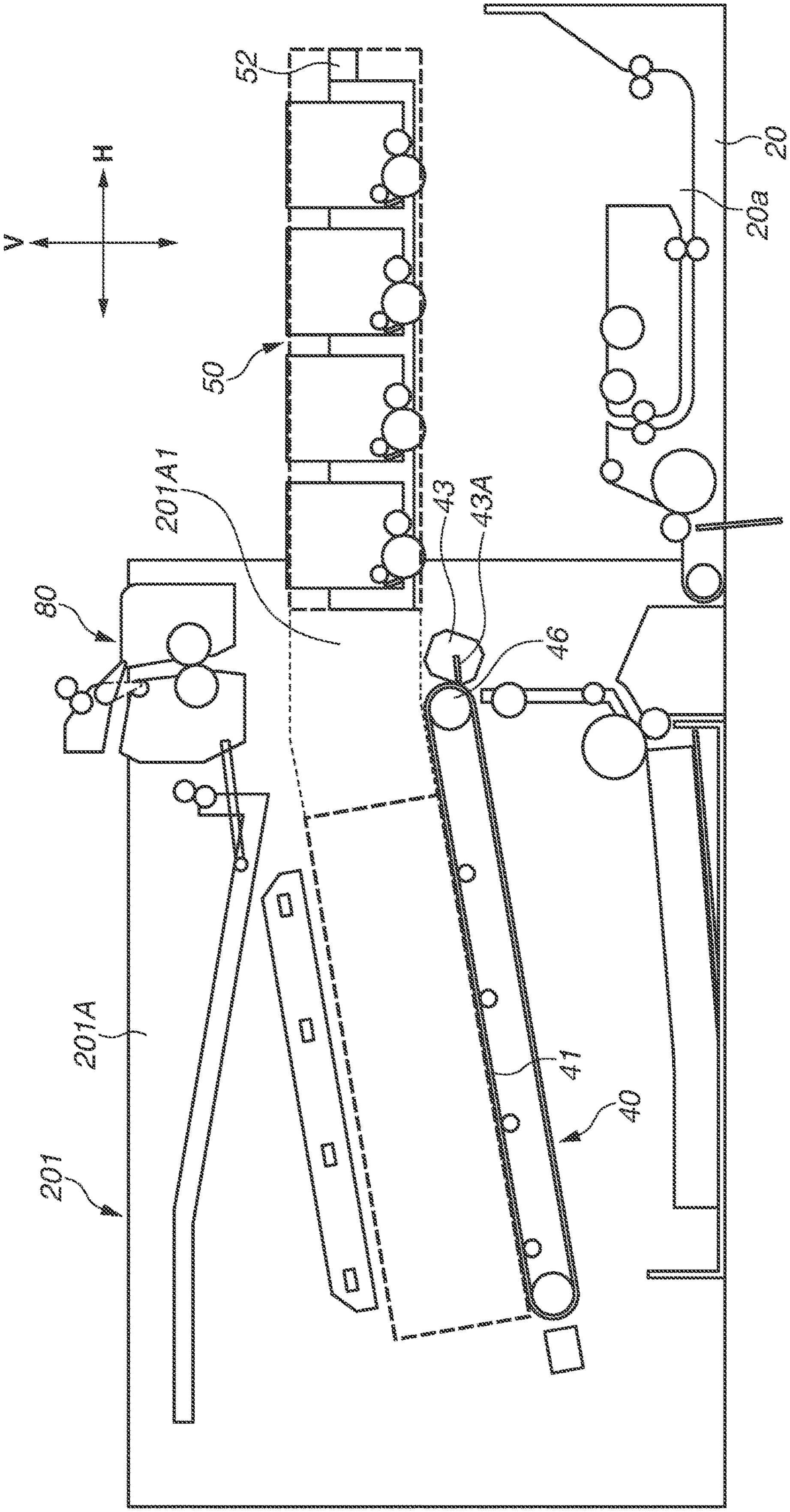
FIG. 16 is a diagram illustrating the printer according to the third exemplary embodiment with a tray unit pulled out.

A relationship between the tray unit 50 and the transfer unit 40 will be described with reference to FIGS. 15 and 16. FIG. 15 is a diagram illustrating the printer 201 with the door 20, the fixing device 80, and the cleaning unit 43 moved. FIG. 16 is a diagram illustrating the printer 201 with the tray unit 50 pulled out.

As in the first exemplary embodiment, before the tray unit 50 is moved, the door 20 and the fixing device 80 are retracted from the first space. In this third exemplary embodiment, the cleaning unit 43 is further rotated about the driving roller 46 as illustrated in FIG. 15, whereby the cleaning unit 43 is separated from the tray unit 50 and moved out of the first space.

The cleaning unit 43 is moved with respect to the belt 41 out of the first space. The rotation of the cleaning unit 43 about the driving roller 46 can move the cleaning unit 43 without separating the cleaning blade 43A from the belt 41.

The user then grips the tray handle 52 and moves the tray unit 50 to outside the apparatus main body 201A, whereby the tray unit 50 can be pulled out of the apparatus main body 201A as illustrated in FIG. 16. While in the present exemplary embodiment the cleaning unit 43 is moved before the movement of the tray unit 50, the cleaning unit 43 may be rotated with the movement of the tray unit 50.

According to the configuration of the present exemplary embodiment, the tray unit 50 can be moved out of the apparatus main body 201A with the transfer unit 40 positioned inside the apparatus main body 201A. The tray unit 50 can thus be moved by a small force as compared with a configuration where the tray unit 50 is moved out of the apparatus main body 201A along with the transfer unit 40. Again, in the present exemplary embodiment, the tray unit 50 passes under the fixing device 80 when being moved from the first inner position to the first outer position. The transfer unit 40 passes under the fixing device 80 when being moved from the second inner position to the second outer position.

Figure 18:
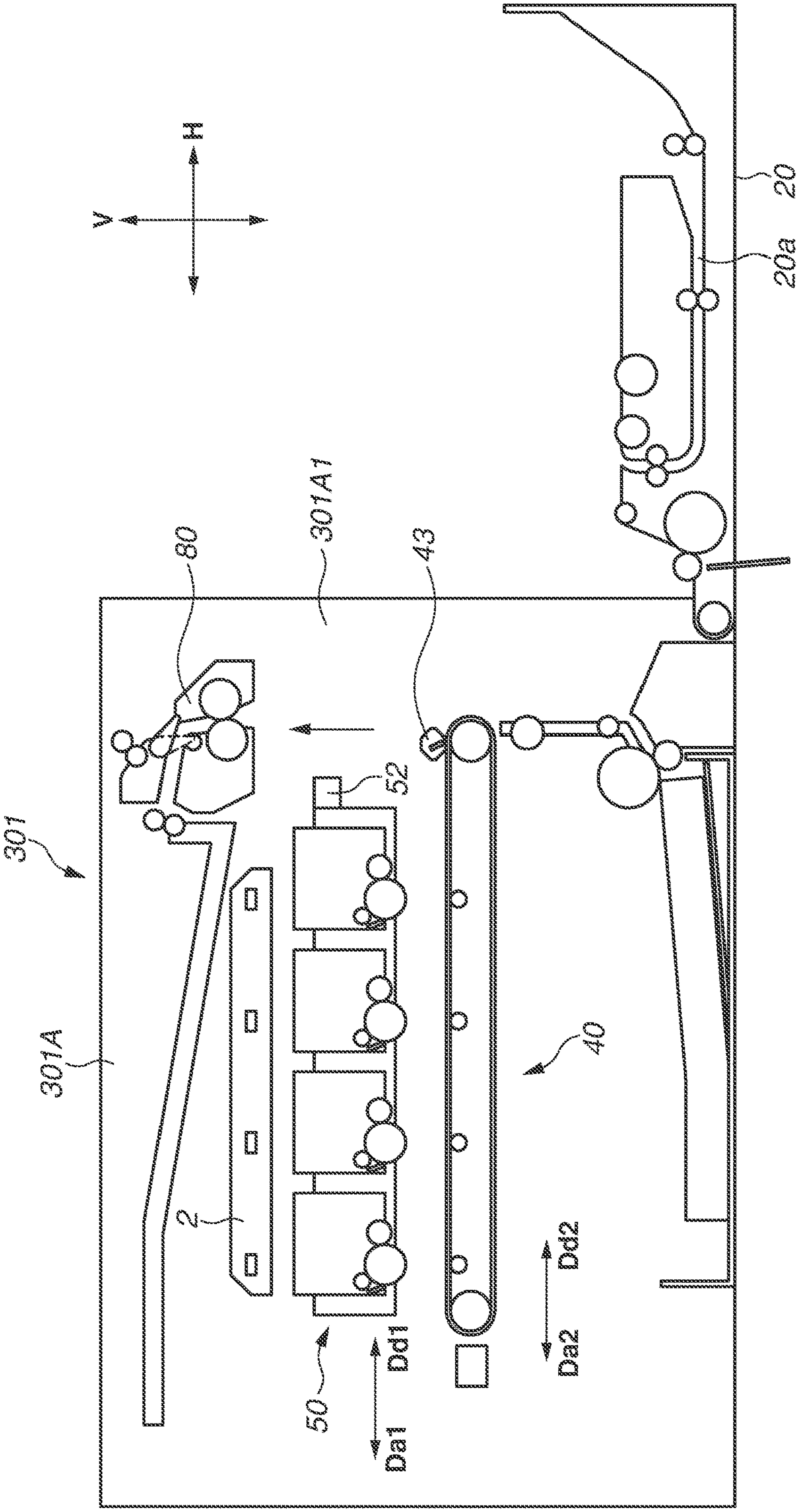
FIG. 18 is a diagram illustrating the printer according to the fourth exemplary embodiment with a door and a transfer unit moved.
Figure 19:
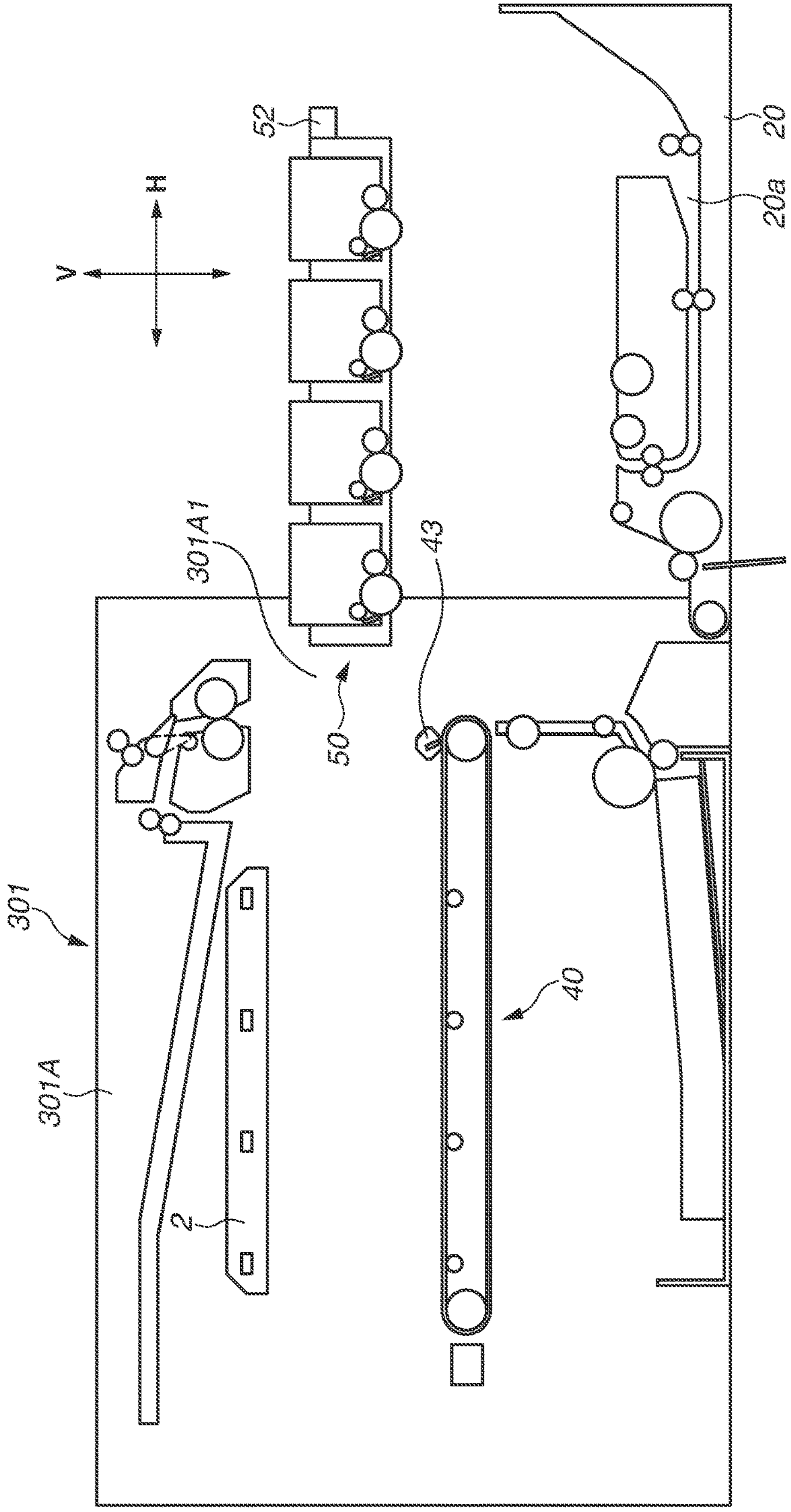
FIG. 19 is a diagram illustrating the printer according to the fourth exemplary embodiment with a tray unit pulled out.

A fourth exemplary embodiment will be described with reference to FIGS. 17, 18, and 19. In the fourth exemplary embodiment, components similar to those described in the foregoing exemplary embodiments are denoted by the same reference numerals as used in the exemplary embodiments. A description of the components similar to those of the exemplary embodiments may be omitted.

A printer 301 that is an image forming apparatus according to the present exemplary embodiment includes an apparatus main body 301A provided with an opening 301A1. The printer 301, the apparatus main body 301A, and the opening 301A1 correspond to the printer 1, the apparatus main body 1A, and the opening 1A1 of the first exemplary embodiment, respectively.

Figure 17:
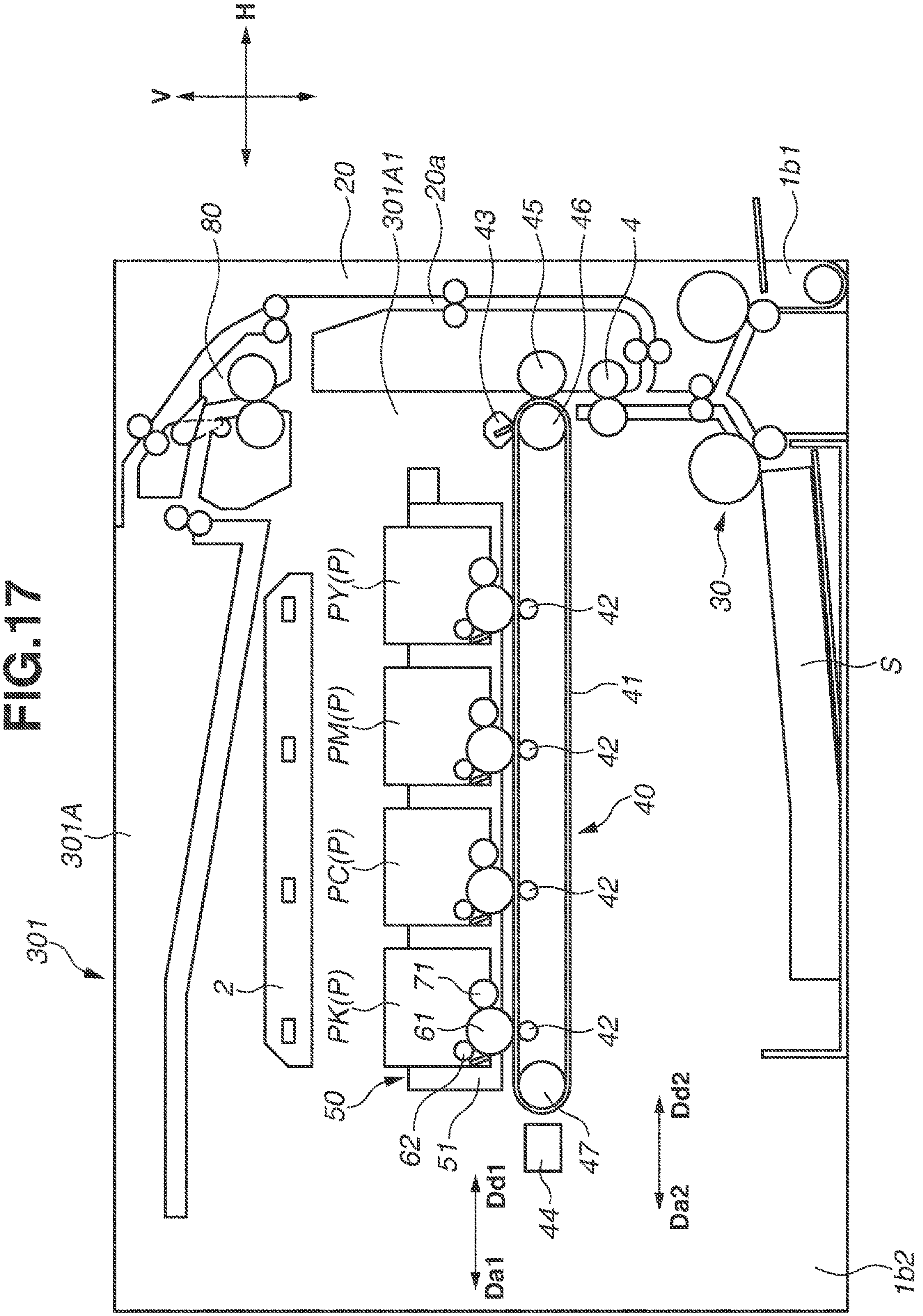
FIG. 17 illustrates the overall configuration of a printer according to a fourth exemplary embodiment.

FIG. 17 illustrates an overall configuration of the printer 301 that is the image forming apparatus according to the present exemplary embodiment. FIG. 18 is an overall view of the printer 301 with the door 20 open. FIG. 19 is an overall view of the printer 301 with the tray unit 50 pulled out.

Again, in the present exemplary embodiment, the tray unit 50 and the transfer unit 40 can be said to satisfy the following relationship. In the state where the tray unit 50 is at the first inner position and the transfer unit 40 is at the second inner position, a part of the transfer unit 40 (in the present exemplary embodiment, cleaning unit 43) is located downstream of the tray unit 50 in the moving direction where the tray unit 50 is moved from the first inner position to the first outer position. In the vertical direction V, an area where the part of the transfer unit 40 (cleaning unit 43) downstream of the tray unit 50 is positioned overlaps at least in part with an area where the tray unit 50 is positioned.

The locus of movement of the tray unit 50 out of the apparatus main body 301A according to the fourth exemplary embodiment will be described. As illustrated in FIG. 18, the tray unit 50 is lifted away from the transfer unit 40 in an interlocked manner with the operation of opening the door 20. The position of the tray unit 50 here may be referred to as a first intermediate position. If the door 20 is closed in such a state, the tray unit 50 is lowered to the first inner position. With the tray unit 50 at the first intermediate position, the belt 41 is separated from the photosensitive drums 61.

The tray unit 50 is then moved out of the apparatus main body 301A through the opening 301A1 between the transfer unit 40 and the fixing device 80.

The printer 301 according to the fourth exemplary embodiment is configured so that, in the apparatus main body 301A, the fixing device 80 at the use position and the transfer unit 40 at the second inner position are positioned outside the first space for the tray unit 50 to pass through in being moved from the first inner position to the first outer position. The tray unit 50 can thus be moved out of the apparatus main body 301A even with the fixing device 80 and the transfer unit 40 positioned at the same positions as when image formation is performed on a sheet S.

While the apparatus main body 301A according to the present exemplary embodiment entails a space for enabling the lifting of the tray unit 50, the fixing device 80 and the transfer unit 40 do not need to be moved in pulling the tray unit 50 out of the apparatus main body 301A. Moreover, the tray unit 50 can be moved by a small force as compared with a configuration where the tray unit 50 is moved out of the apparatus main body 301A along with the transfer unit 40. Again, in the present exemplary embodiment, the tray unit 50 passes under the fixing device 80 when being moved from the first inner position to the first outer position. The transfer unit 40 passes under the fixing device 80 when being moved from the second inner position to the second outer position.

Figure 21:
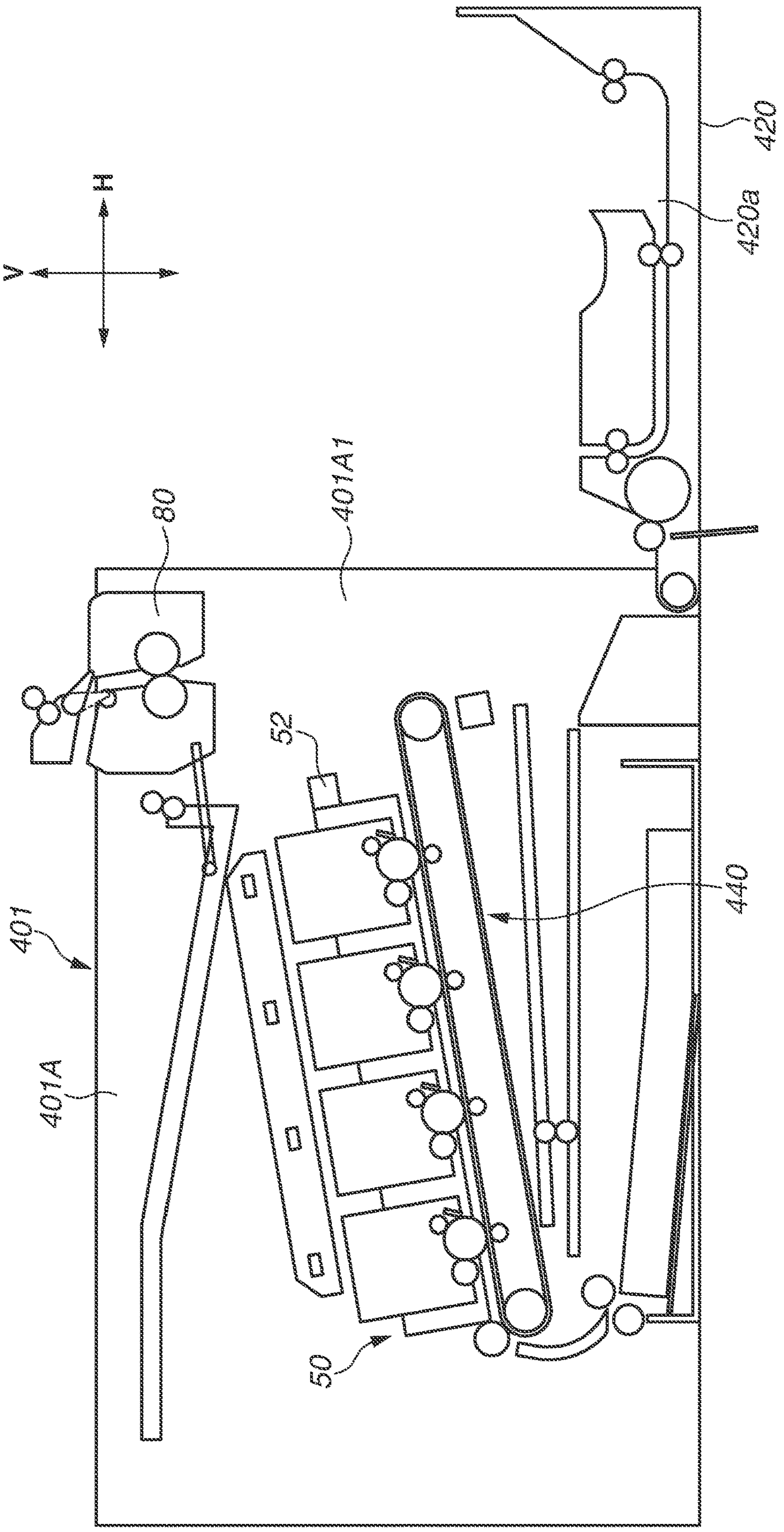
FIG. 21 is a diagram illustrating the printer according to the fifth exemplary embodiment with a door and a fixing device moved.
Figure 22:
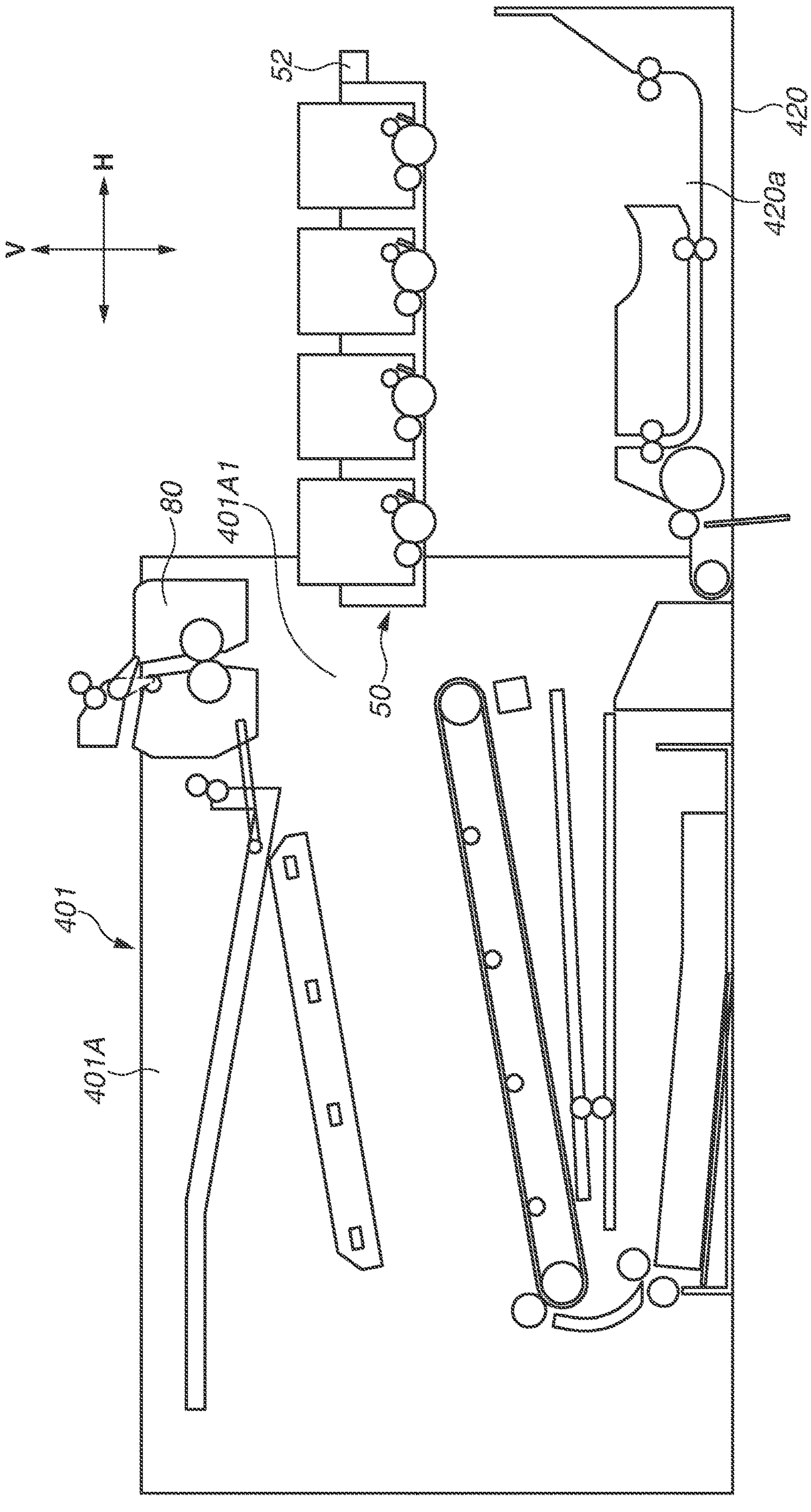
FIG. 22 is a diagram illustrating the printer according to the fifth exemplary embodiment with a tray unit pulled out.

A fifth exemplary embodiment will be described with reference to FIGS. 20, 21, and 22. In the fifth exemplary embodiment, components similar to those described in the foregoing exemplary embodiments are denoted by the same reference numerals as used in the exemplary embodiments. A description of the components similar to those of the exemplary embodiments may be omitted.

A printer 401 that is an image forming apparatus according to the present exemplary embodiment includes an apparatus main body 401A provided with an opening 401A1, and a door 420. The printer 401, the apparatus main body 401A, and the opening 401A1 correspond to the printer 1, the apparatus main body 1A, and the opening 1A1 of the first exemplary embodiment, respectively.

Figure 20:
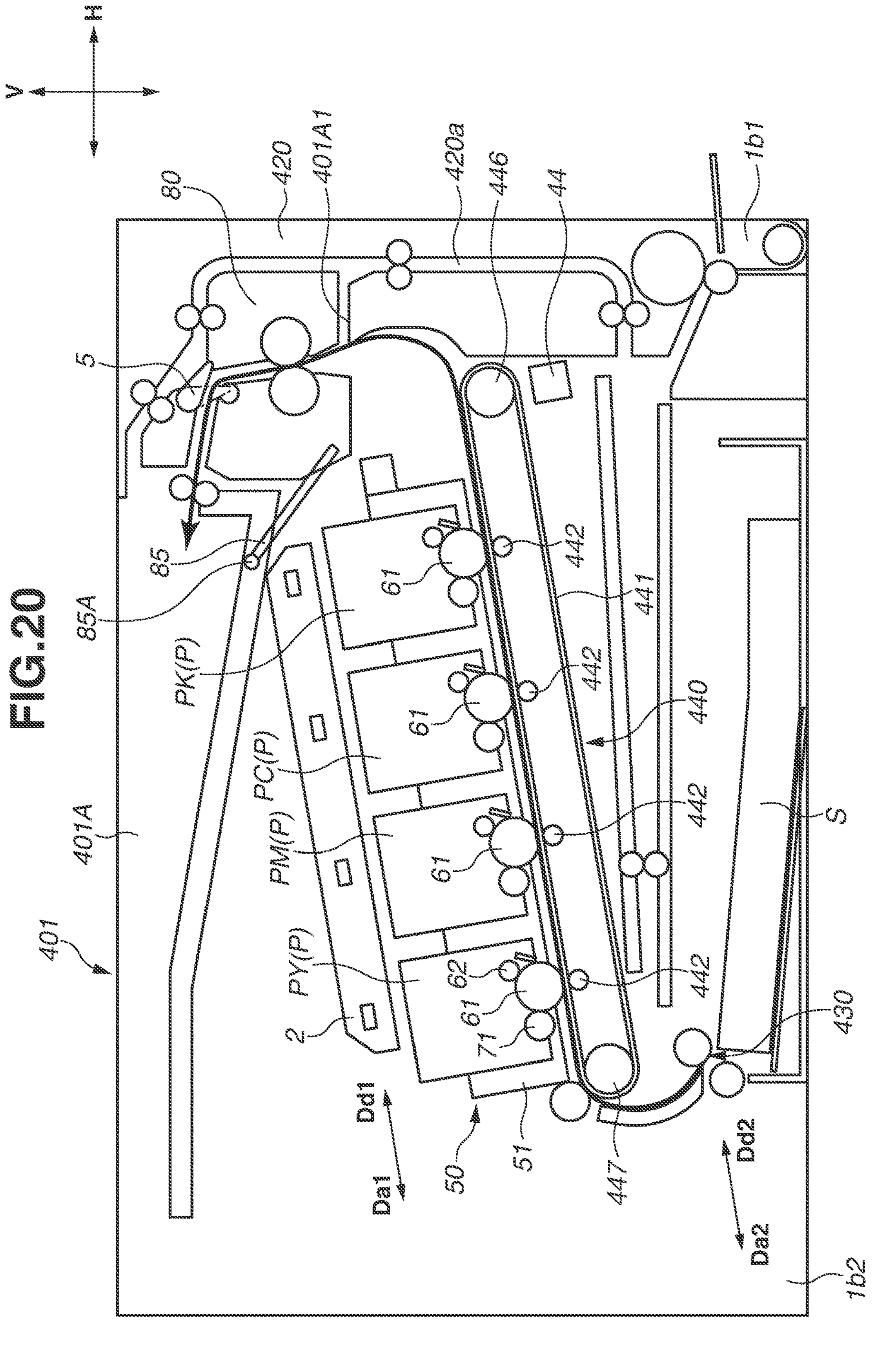
FIG. 20 illustrates the overall configuration of a printer according to a fifth exemplary embodiment.

FIG. 20 illustrates an overall configuration of the printer 401 that is the image forming apparatus according to the present exemplary embodiment. FIG. 21 is a diagram illustrating the printer 401 with the fixing device 80 moved. FIG. 22 is a diagram illustrating the printer 401 with the tray unit 50 pulled out.

In the first to fourth exemplary embodiments, toner images formed on the photosensitive drums 61 are transferred to the belt 41 of the transfer unit 40, and then transferred from the belt 41 to the sheet S at the secondary transfer portion. In other words, the transfer units 40 according to the first to fourth exemplary embodiments have a function as an intermediate transfer unit.

By contrast, according to the fifth exemplary embodiment, a transfer unit (transfer device) 440 conveys a sheet S using a belt (conveying belt) 441 so that the sheet S contacts the photosensitive drums 61 and the toner images are transferred from the photosensitive drums 61 to the sheet S. In other words, the transfer unit 440 according to the present exemplary embodiment has a function as a conveyance belt unit.

The printer 401 that is the image forming apparatus according to this fifth exemplary embodiment includes the apparatus main body 401A, a sheet feed unit 430, and the transfer unit 440. As in the first exemplary embodiment, the fixing device 80 is disposed at one end side of the apparatus main body 401A.

The transfer unit 440 includes the belt 441 for conveying a sheet S, four primary transfer rollers 442, a driving roller 446, and a tension roller 447. The printer 401 according to the present exemplary embodiment includes an optical sensor 44 for detecting a toner image transferred to the belt 441.

The tray unit 50 is moved out of the apparatus main body 401A from the one end side of the apparatus main body 401A. Specifically, the opening 401A1 for the tray unit 50 to pass through is arranged at the one end side of the apparatus main body 401A. The door 420 can be moved between a closed position where the opening 401A1 is covered and an open position where the opening 401A1 is exposed.

As in the first exemplary embodiment, toner images are formed on the photosensitive drums 61 based on image information. Meanwhile, a sheet S fed from the sheet feed unit 430 is conveyed in contact with the photosensitive drums 61 by the belt 441. Here, transfer voltages are applied to the primary transfer rollers 442, whereby the toner images are transferred from the photosensitive drums 61 to the sheet S.

The sheet S to which the toner images are transferred is conveyed to the fixing device 80. The toner images are fixed to the sheet S by the fixing device 80.

In performing one-sided printing, the sheet S that has passed through the fixing device 80 is discharged by the flapper 5 to a discharge tray formed in the upper part of the apparatus main body 401A. In performing two-sided printing, the sheet S reversed by the flapper 5 is delivered from a two-sided conveyance path 420*a* inside the door 420 to the belt 441 again through a return conveyance path disposed above the sheet feed unit 430. The sheet S is conveyed to the position to contact the photosensitive drums 61 by the belt 441. After toner images are transferred from the photosensitive drums 61 to the back of the sheet S, the sheet S passes through the fixing device 80 and is discharged to the discharge tray.

As in the first exemplary embodiment, in performing the image forming operation on the sheet S, at least a part of the fixing device 80 overlaps with the first space for the tray unit 50 to pass through in being moved from the first inner position to the first outer position. In moving the tray unit 50 out of the apparatus main body 401A, the fixing device 80 is therefore moved out of the first space.

Like the printer 1 according to the first exemplary embodiment, the printer 401 according to the present exemplary embodiment is also configured so that the transfer unit 440 and the tray unit 50 can be moved into and out of the apparatus main body 401A through the one end side of the apparatus main body 401A while the fixing device 80 is disposed at one end side of the apparatus main body 401A. In other words, when the transfer unit 440 is moved from the second inner position to the second outer position, the transfer unit 440 is moved away from the other end side (second end 1*b*2) of the apparatus main body 401A. When the tray unit 50 is moved from the first inner position to the first outer position, the tray unit 50 is moved away from the other end side (second end 1*b*2) of the apparatus main body 401A. As a result, the user can work to clear a jam, access the fixing device 80, and operate the transfer unit 440 and the tray unit 50 in one direction.

In the present exemplary embodiment, the tray unit 50 can be singly moved to the first outer position. However, as in the first exemplary embodiment, the tray unit 50 may be moved to the first outer position along with the transfer unit 440. Again, in the present exemplary embodiment, the tray unit 50 passes under the fixing device 80 when being moved from the first inner position to the first outer position. The transfer unit 440 passes under the fixing device 80 when being moved from the second inner position to the second outer position.

Figure 23:
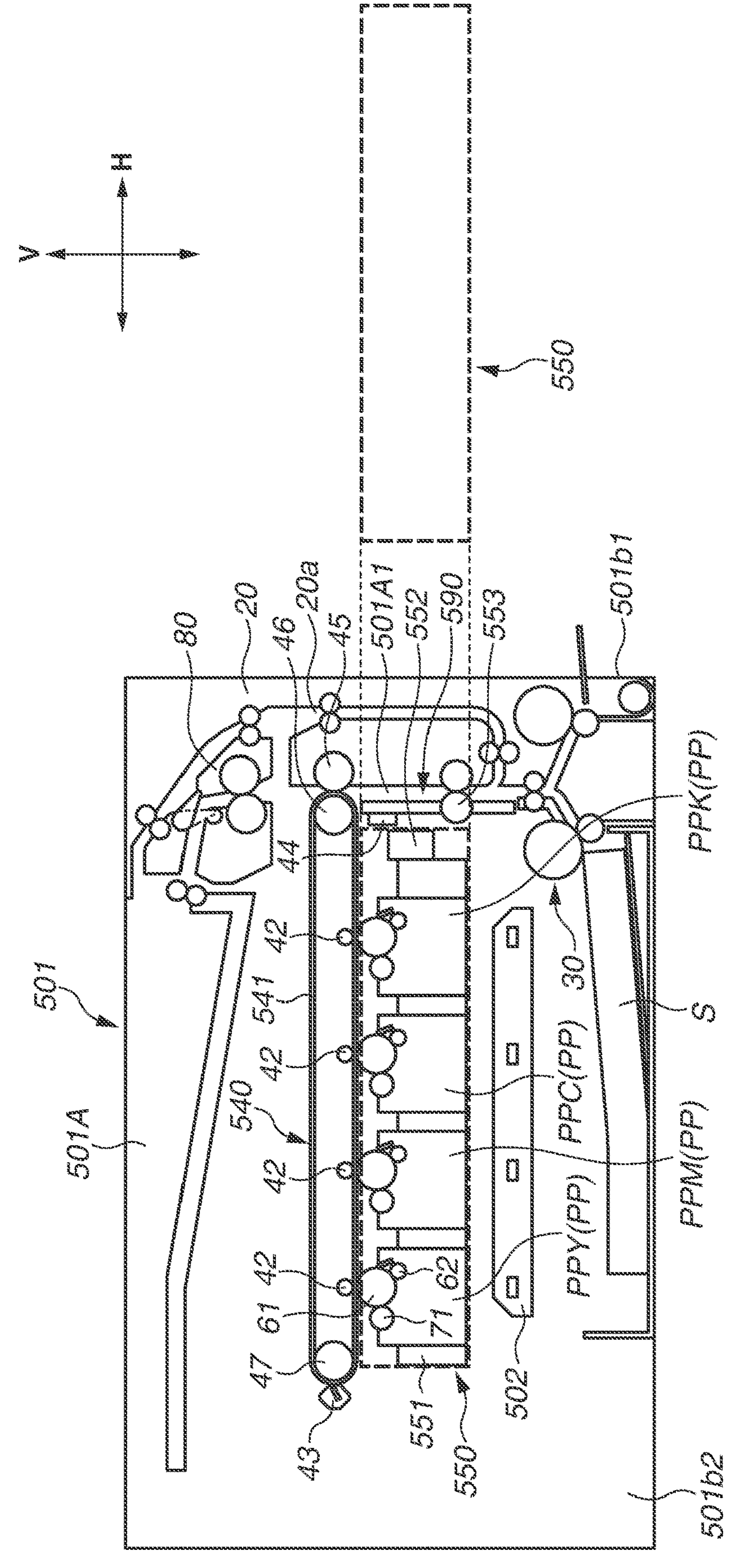
FIG. 23 illustrates the overall configuration of a printer according to a sixth exemplary embodiment.

A sixth exemplary embodiment will be described with reference to FIGS. 23, 24, and 25. In the sixth exemplary embodiment, components similar to those described in the foregoing exemplary embodiments are denoted by the same reference numerals as used in the exemplary embodiments. A description of the components similar to those of the exemplary embodiments may be omitted.

A printer 501 that is an image forming apparatus according to the present exemplary embodiment includes an apparatus main body 501A provided with an opening 501A1, and a door 20. The printer 501, the apparatus main body 501A, and the opening 501A1 correspond to the printer 1, the apparatus main body 1A, and the opening 1A1 of the first exemplary embodiment, respectively.

The printer 501 further includes a transfer unit (transfer device) 540, a tray unit 550, and a scanner 502. The transfer unit 540, the tray unit 550, and the scanner 502 correspond to the transfer unit 40, the tray unit 50, and the scanner 2 of the first exemplary embodiment, respectively.

In the printer 501 according to the present exemplary embodiment, the transfer unit 540 is disposed above the tray unit 550, and the scanner 502 is disposed below the tray unit 550.

The printer 501 serving as an image forming apparatus will be described with reference to FIG. 23. FIG. 23 illustrates an overall configuration of the printer 501.

The tray unit 550 according to the present exemplary embodiment includes a tray (support member or drawer) 551 and cartridges PPY, PPM, PPC, and PPK. The tray 551 includes a tray handle 552. The cartridges PPY, PPM, PPC, and PPK are detachably attached to the tray 551.

The cartridges PPY, PPM, PPC, and PPK can be attached to and detached from the tray 551 independent of each other. The cartridges PPY, PPM, PPC, and PPK accommodate Y, M, C, and K toners (developers), respectively. The cartridges PPY, PPM, PPC, and PPK have the same configuration except that toners of different colors are accommodated. If the cartridges PPY, PPM, PPC, and PPK do not need to be distinguished, the cartridges PPY, PPM, PPC and PPK may therefore be referred to simply as cartridges PP.

The tray unit 550 includes four photosensitive drums (image bearing members) 61, four charging rollers (charging members) 62, and four developing rollers (developer bearing members) 71. In the present exemplary embodiment, the cartridge PPK will be referred to as a first cartridge, the cartridge PPC a second cartridge, the cartridge PPM a third cartridge, and the cartridge PPY a fourth cartridge. In the present exemplary embodiment, the cartridges PP include the photosensitive drums 61, the charging rollers 62, and the developing rollers 71.

The transfer unit 540 includes a belt 541, primary transfer rollers 42, a cleaning unit 43, a driving roller 46 for driving the belt 541, and a tension roller (driven roller) 47.

The printer 501 according to the present exemplary embodiment includes an optical sensor 44 for detecting a toner image transferred to the belt 541, and a conveyance unit 590 including a conveyance roller 553.

The conveyance unit 590 is disposed upstream of a secondary transfer portion in the conveyance direction of the sheet S, and configured to convey the sheet S toward the secondary transfer portion and the fixing device 80.

In the present exemplary embodiment, the belt 541 is disposed over the photosensitive drums 61 and can contact the photosensitive drums 61 to form primary transfer portions. The printer 501 also includes a secondary transfer roller 45 that contacts the belt 541 to form the secondary transfer portion. The directions of the rotation axes of the primary transfer rollers 42, that of the driving roller 46, that of the tension roller 47, and that of the secondary transfer roller 45 are parallel.

Figure 24:
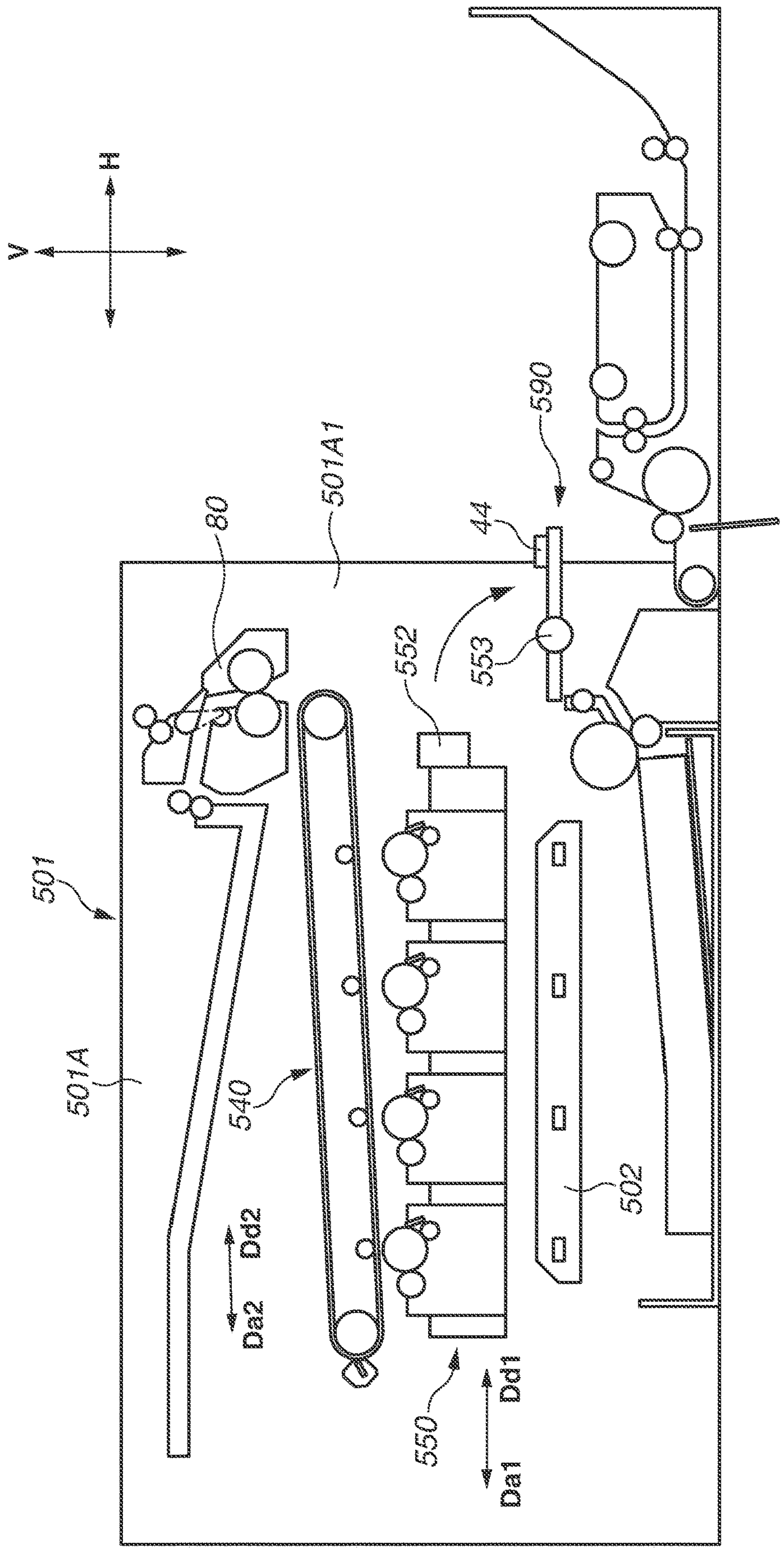
FIG. 24 is an overall view with a door, a transfer unit, and a conveyance unit moved according to the sixth exemplary embodiment.
Figure 25:
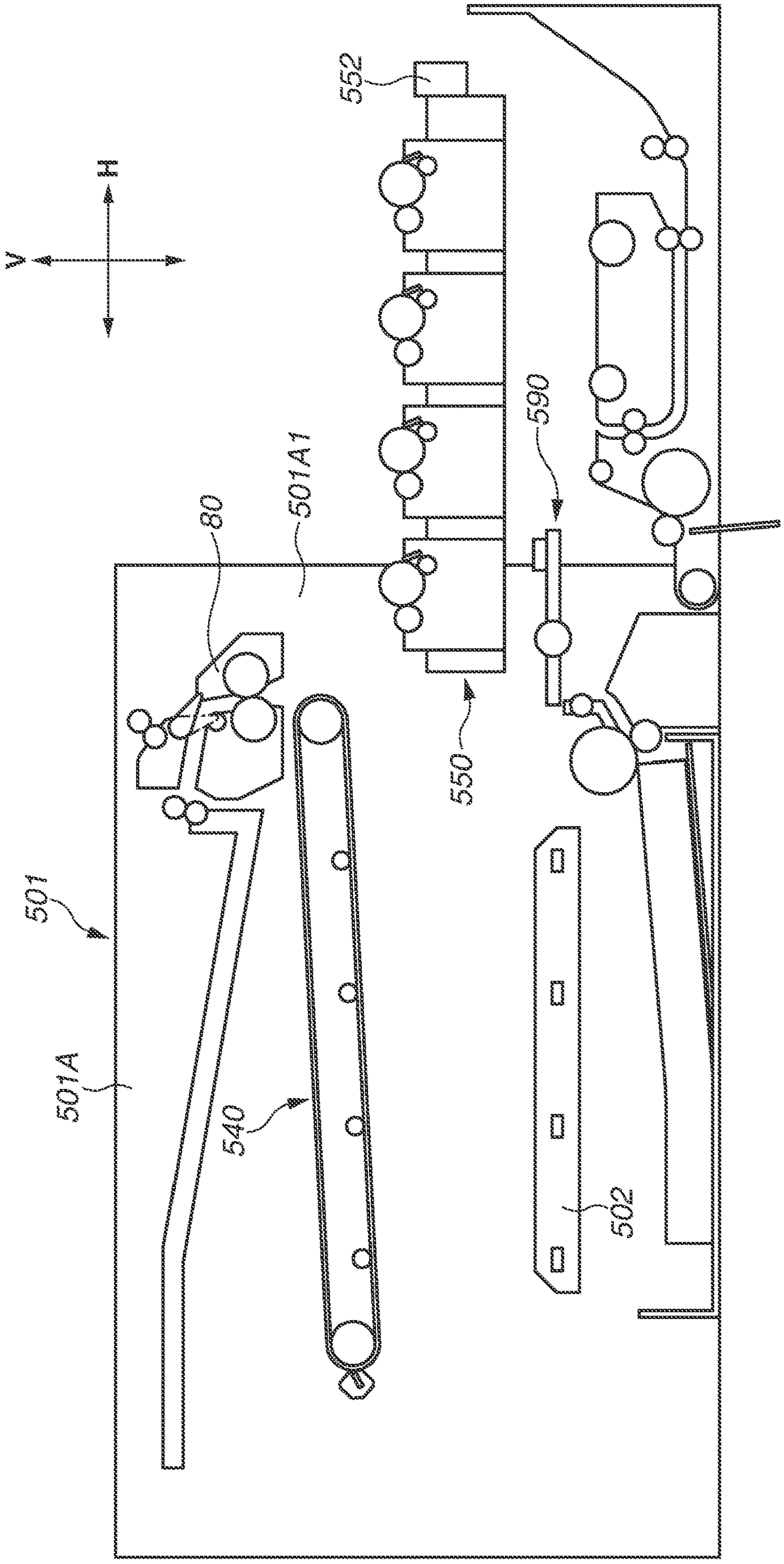
FIG. 25 is an overall view of the sixth exemplary embodiment with a tray unit pulled out.

FIG. 24 is a diagram illustrating the printer 501 with the door 20, the transfer unit 540, and the conveyance unit 590 moved. FIG. 25 is a diagram illustrating the printer 501 with the tray unit 550 pulled out.

The transfer unit 540 and the tray unit 550 can be moved from inside to outside the apparatus main body 501A. Specifically, the fixing device 80 is disposed at one end side of the apparatus main body 501A in the horizontal direction. The opening 501A1 for the transfer unit 540 and the tray unit 550 to pass through is formed at the one end side.

The door 20 attached to the apparatus main body 501A can be moved between a closed position where the opening 501A1 is covered (FIG. 23) and an open position (FIG. 24).

The apparatus main body 501A includes a first end 501*b*1 having the opening 501A1 and a second end 501*b*2 opposite to the first end 501*b*1 in a horizontal direction H. The tray unit 550 can be moved to a first inner position inside the apparatus main body 501A and a first outer position outside the apparatus main body 501A through the opening 501A1. The transfer unit 540 can be moved to a second inner position inside the apparatus main body 501A and a second outer position outside apparatus main body 501A through the opening 501A1. The opening 501A1 may include an opening for the tray unit 550 to pass through and an opening for the transfer unit 540 to pass through.

In the horizontal direction H, the fixing device 80 is closer to the first end **501*b*1 than to the second end 501*b*2. In other words, in the horizontal direction H, the distance between the fixing device 80 and the first end 501*b*1 is smaller than the distance between the fixing device 80 and the second end 501*b*2**.

When the tray unit 550 is moved from the first inner position to the first outer position, the moving direction of the tray unit 550 intersects with the rotation axes of the photosensitive drums 61. Here, the tray units 550 is moved away from the second end **501*b*2**.

As described above, when the transfer unit 540 is moved from the second inner position to the second outer position, the moving direction of the transfer unit 540 intersects with the rotation axes of the photosensitive drums 61. Here, the transfer unit 540 is moved away from the second end **501*b*2**.

In the present exemplary embodiment, at least a part of the conveyance unit 590 at the position where the image forming operation is performed on the sheet S is located in a first space for tray unit 550 to pass through in being moved from the first inner position to the first outer position.

In the present exemplary embodiment, in moving the tray unit 550 from the first inner position to the first outer position, the transfer unit 540 is tilted away from the tray unit 550 as illustrated in FIG. 24.

Meanwhile, the conveyance unit 590 is rotated clockwise to move away from the tray unit 550 and is moved out of the first space. The user then grips the tray handle 552 and moves the tray unit 550 to outside the apparatus main body 501A, whereby the tray unit 550 as illustrated in FIG. 25 can be pulled out of the apparatus main body 501A.

With the tray unit 550 moved out of the apparatus main body 501A (FIG. 25), the cartridges PPY, PPM, PPC, and PPK can be detached from the tray 551, and can be attached to the tray 551. In such a manner, the cartridges PPY, PPM, PPC, and PPK can be replaced with new cartridges PPY, PPM, PPC, and PPK.

The transfer unit 540 can further be detached from the apparatus main body 501A and replaced with a new transfer unit 540.

In the printer 501 according to the present exemplary embodiment, like the printer 1 of the first exemplary embodiment, the transfer unit 540 and the tray unit 550 can be moved into and out of the apparatus main body 501A through the one end side of the apparatus main body 501A while the fixing device 80 is disposed at the one end side of the apparatus main body 501A. As a result, the user can work to clear a jam, access the fixing device 80, and operate the transfer unit 540 and the tray unit 550 in one direction. Again, in the present exemplary embodiment, the tray unit 550 passes under the fixing device 80 when being moved from the first inner position to the first outer position. The transfer unit 540 passes under the fixing device 80 when being moved from the second inner position to the second outer position.

The configurations described in the exemplary embodiments can be combined as appropriate.

According to an exemplary embodiment of the present disclosure, the conventional art can be further developed.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-145891, filed Sep. 14, 2022, and Japanese Patent Application No. 2023-125135, filed Jul. 31, 2023, which is hereby incorporated by reference herein in its entirety.

What is claimed is:

1. An image forming apparatus configured to form an image on a recording material, the image forming apparatus comprising:

an apparatus main body including a first end provided with a main body opening and a second end opposite to the first end in a horizontal direction;

a fixing device configured to heat the recording material;

an opening and closing member attached to the apparatus main body, wherein the opening and closing member is configured to be moved from a closed position, where the main body opening is covered, to an open position where the main body opening is exposed so that the opening and closing member separates from the fixing device;

a drawer unit including (i) a first cartridge, (ii) a support member to which the first cartridge is detachably attached, and (iii) a first photosensitive drum disposed on the support member or the first cartridge, wherein the drawer unit is configured to be moved to a first inner position inside the apparatus main body and to a first outer position outside the apparatus main body; and a transfer device configured to be moved to a second inner position inside the apparatus main body and to a second outer position outside the apparatus main body and including a belt, wherein the belt is configured to contact the first photosensitive drum with the transfer device at the second inner position, wherein the fixing device is closer to the first end than to the second end, wherein, when being moved from the first inner position to the first outer position through the main body opening, the drawer unit is configured to be moved in a moving direction intersecting with a rotation axis of the first photosensitive drum, and be moved away from the second end, and wherein, when being moved from the second inner position to the second outer position, the transfer device is configured to be moved away from the second end.

2. The image forming apparatus according to claim 1, wherein, in a state where the opening and closing member is open, the drawer unit is at the first outer position, and the transfer device is at the second outer position, the opening and closing member supports the transfer device, and the transfer device supported by the opening and closing member supports the drawer unit.

3. The image forming apparatus according to claim 1, wherein the drawer unit includes a second cartridge detachably attached to the support member, and a second photosensitive drum disposed on the second cartridge or the support member.

4. The image forming apparatus according to claim 3, wherein, with the drawer unit at the first inner position, the second photosensitive drum is closer to the first end than the first photosensitive drum is, and a rotation axis of the second photosensitive drum is located above the rotation axis of the first photosensitive drum in a vertical direction.

5. The image forming apparatus according to claim 1, wherein, when being moved from the first inner position to the first outer position, the drawer unit is configured to be moved in a direction oblique to the horizontal direction.

6. The image forming apparatus according to claim 5, wherein, when being moved from the first inner position to the first outer position, the drawer unit further is configured to be moved in a direction obliquely upward with respect to the horizontal direction.

7. The image forming apparatus according to claim 1 wherein, at the closed position, the opening and closing member is configured to cover a first path for the recording material traveling toward the fixing device to pass through, and wherein the opening and closing member includes a second path for the recording material that has passed through the fixing device to pass through.

8. The image forming apparatus according to claim 7, wherein, when the opening and closing member is at the closed position, at least a first part of the second path is configured to be located in a first space for the drawer unit to pass through in being moved from the first inner position to the first outer position.

9. The image forming apparatus according to claim 8, wherein, when the opening and closing member is at the closed position, at least a second part of the second path is configured to be located in a second space for the transfer device to pass through in being moved from the second inner position to the second outer position.

10. The image forming apparatus according to claim 1, wherein the transfer device includes a driving roller configured to drive the belt, and a driven roller where the driving roller is located downstream of the driven roller in a direction where the transfer device is moved from the second inner position to the second outer position.

11. The image forming apparatus according to claim 1, further comprising a conveyance unit configured to convey the recording material toward the fixing device, wherein at least a part of the conveyance unit is located in a first space for the drawer unit to pass through in being moved from the first inner position to the first outer position.

12. The image forming apparatus according to claim 1, wherein the drawer unit is configured to be moved from the first inner position to the first outer position and the transfer device is configured to be moved from the second inner position to the second outer position with the fixing device coupled to the apparatus main body.

13. The image forming apparatus according to claim 1, wherein the drawer unit is configured to pass under the fixing device in being moved from the first inner position to the first outer position, and wherein the transfer device is configured to pass under the fixing device in being moved from the second inner position to the second outer position.

14. The image forming apparatus according to claim 1, further comprising a transfer roller;

wherein the belt is configured to contact the first photosensitive drum so that a first transfer portion is formed between the first photosensitive drum and the belt, and wherein the transfer roller is configured to contact the belt so that a second transfer portion is formed between the belt and the transfer roller.

15. The image forming apparatus according to claim 14, wherein, in a state where the opening and closing member is in the closed position, the transfer roller is located inside a space through which the transfer device passes when moved from the second inner position to the second outer position, and wherein, in a state where the opening and closing member is in the open position, the transfer roller is located outside the space.

16. The image forming apparatus according to claim 1, wherein, when the drawer unit is moved from the first inner position to the first outer position, a moving direction of the drawer unit changes.

17. The image forming apparatus according to claim 1, wherein, when the transfer device is moved from the second inner position to the second outer position, a moving direction of the transfer device changes.

* * * * *